US012629949B2

(12) United States Patent
Hanada et al.

(10) Patent No.: US 12,629,949 B2
(45) Date of Patent: May 19, 2026

(54) PRINTING DEVICE HAVING RESTRICTING PART ON COVER FOR RESTRICTING DISPLACEMENT OF MOUNTED TAPE CASSETTE DUE TO THRUST LOAD, AND TAPE CASSETTE THEREFOR

(71) Applicant: BROTHER KOGYO KABUSHIKI KAISHA, Nagoya (JP)

(72) Inventors: Akinori Hanada, Nagoya (JP); Shinji Ukai, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/894,238

(22) Filed: Sep. 24, 2024

(65) Prior Publication Data

US 2025/0108642 A1 Apr. 3, 2025

(30) Foreign Application Priority Data

Sep. 28, 2023 (JP) ................................ 2023-167697

(51) Int. Cl.

*B41J 32/02* (2006.01)
*B41J 3/36* (2006.01)
*B41J 15/04* (2006.01)
*B41J 29/13* (2006.01)

(52) U.S. Cl.

CPC ............... *B41J 15/044* (2013.01); *B41J 3/36* (2013.01); *B41J 29/13* (2013.01); *B41J 32/02* (2013.01)

(58) Field of Classification Search

CPC ......... B41J 15/044; B41J 29/13; B41J 3/4075
See application file for complete search history.

(56) References Cited

U.S. PATENT DOCUMENTS

| | | | | |
|---|---|---|---|---|
| 7,077,587 | B2 * | 7/2006 | Tanaka | B41J 3/4075 400/621 |
| 10,647,135 | B2 * | 5/2020 | Kubota | B41J 11/0095 |
| 2010/0119280 | A1 * | 5/2010 | Vandermeulen | B41J 3/4075 400/208 |
| 2010/0272492 | A1 * | 10/2010 | Van Britsom | B41J 15/044 400/613 |
| 2017/0106677 | A1 * | 4/2017 | Sakano | B41J 17/32 |
| 2020/0307292 | A1 * | 10/2020 | Kosuge | B41J 3/4075 |

FOREIGN PATENT DOCUMENTS

| | | | | |
|---|---|---|---|---|
| JP | 2011-046089 A | | 3/2011 | |
| WO | WO-2011134542 A1 | * | 11/2011 | B41J 3/4075 |
| WO | WO-2019020047 A1 | * | 1/2019 | G03G 21/1864 |

* cited by examiner

*Primary Examiner* — Christle I Marshall
(74) *Attorney, Agent, or Firm* — Kenealy Vaidya LLP

(57) ABSTRACT

A printing device includes a housing, a mounting compartment, a printing unit, and a cover attachable to the housing. A tape cassette accommodating a printing tape is mountable in the mounting compartment in a mounting direction. A platen gear of the printing unit and an output gear of the tape cassette are helical gears configured such that a thrust load is applied to the output gear in the mounting direction at a mesh point therebetween while rotating. The cover has a restriction part configured to contact the mounted tape cassette while the cover is closed to restrict the tape cassette from rotating by the thrust load about an axis passing through first and second support parts provided at the mounting compartment. The restriction part is positioned in a region on an opposite side of the axis from the mesh point when viewed in the mounting direction.

15 Claims, 16 Drawing Sheets

PRINTING DEVICE HAVING RESTRICTING PART ON COVER FOR RESTRICTING DISPLACEMENT OF MOUNTED TAPE CASSETTE DUE TO THRUST LOAD, AND TAPE CASSETTE THEREFOR

REFERENCE TO RELATED APPLICATIONS

This application claims priority from Japanese Patent Application No. 2023-167697 filed on Sep. 28, 2023. The entire content of the priority application is incorporated herein by reference.

BACKGROUND ART

A conventional tape printing device has a cassette compartment into which a tape cassette can be mounted, and a cover that can cover the cassette compartment. A pressure-receiving member protrudes from the underside of the cover, and a support-receiving member protrudes from the bottom surface of the cassette compartment. When the cover of the tape printing device is closed, the pressure-receiving member and support-receiving member contact a distal end portion of an arm part of the tape cassette mounted in the cassette compartment from opposite sides. This contact fixes the position of a discharge opening formed in the distal end portion of the arm part, thereby restricting any deviation in position of the tape that is discharged through the discharge opening.

SUMMARY

However, some tape cassettes are provided with an output gear that meshes with a platen gear in the printing device. In this case, stress produced when driving the gears could cause the entire tape cassette to tilt in the cassette compartment, so that supporting the arm part alone may be insufficient to prevent deviation in the position of the discharged tape.

In view of the foregoing, it is an object of the present invention to provide a printing device and a tape cassette that can stabilize the orientation of the tape cassette in the cassette compartment of the printing device.

In order to attain the above and other objects, according to one aspect, the present disclosure provides a printing device including a housing, a mounting compartment, a printing unit, and a cover. The mounting compartment is provided in the housing and has a recessed shape to provide an opening. A tape cassette accommodating a printing tape is mountable in the mounting compartment through the opening in a mounting direction. The mounting compartment includes a first support part and a second support part. The printing unit is provided in the housing and is configured to perform printing on the printing tape drawn out of the tape cassette mounted in the mounting compartment. The printing unit includes: a print head; a platen roller configured to oppose the print head and rotatable about a platen-roller axis parallel to the mounting direction to convey the printing tape of the tape cassette mounted in the mounting compartment; and a platen gear connected to the platen roller. The cover is attachable to and detachable from the housing to provide a closed state where the cover closes the opening of the mounting compartment and an open state where the cover exposes the opening of the mounting compartment. The cover includes a restriction part. The first support part and the second support part support one end portion of the tape cassette mounted in the mounting compartment. The mounting compartment has a bottom surface configured to face the one end portion of the tape cassette mounted in the mounting compartment. The platen gear is configured to mesh with an output gear of the tape cassette a mesh point to receive a driving force from the output gear while the tape cassette is mounted in the mounting compartment. The output gear is rotatable about an output-gear axis parallel to the mounting direction. The platen gear and the output gear of the tape cassette are helical gears configured such that a thrust load is applied to the output gear in the mounting direction at the mesh point while the platen gear and the output gear meshing each other are rotating. While the cover is in the closed state, the restriction part is positioned in a region that is on an opposite side of an axis from the mesh point when viewed in the mounting direction, the axis passing through the first support part and the second support part. While the cover is in the closed state, the restriction part is configured to contact an other end portion of the tape cassette opposite the one end portion in the mounting direction to restrict the tape cassette mounted in the mounting compartment from rotating about the axis by the thrust load applied on the output gear.

The platen gear in the printing device is engaged with the output gear in the tape cassette, and the output gear transmits a drive force for rotating the platen roller. The platen gear is a helical gear configured such that a thrust load is applied to the output gear in the mounting direction at the mesh point between the platen gear and output gear. Consequently, the tape cassette is urged to rotate about the axis passing through the first and second support parts so that the output gear (at the mesh point) moves in the mounting direction. Hence, the area on the opposite side of the axis from the output gear (mesh point) moves in a direction opposite the mounting direction. The restriction part on the cover contacts the other end portion of the tape cassette to restrict rotation of the same. Hence, by maintaining the restriction part in contact with the other end portion of the tape cassette while the printing device is driving, this configuration can stabilize the orientation of the tape cassette and suppress deviation in the position of the printing tape drawn out from the tape cassette.

According to another aspect, the disclosure also provides a tape cassette mountable in a mounting compartment of a printing device in a mounting direction. The printing device includes: a housing; the mounting compartment provided in the housing and having a recessed shape to provide an opening, the mounting compartment including a first support part and a second support part; a printing unit provided in the housing; and a cover attachable to and detachable from the housing to provide a closed state where the cover closes the opening of the mounting compartment and an open state where the cover exposes the opening of the mounting compartment. The printing unit includes: a print head; a platen roller configured to oppose the print head; and a platen gear connected to the platen roller. The tape cassette includes: a tape roll; a case accommodating the tape roll; and an output gear rotatably supported by the case. The tape roll is a roll of a printing tape subject to printing by the printing unit of the printing device. The case had one end portion and an other end portion opposite each other in the mounting direction, the one end portion being configured to face a bottom surface of the mounting compartment while the tape cassette is mounted in the mounting compartment. The case has: a first receiving part provided at the one end portion; a second receiving part provided at the one end portion; and a contact part provided at the other end portion. The first receiving part is configured to be supported by the first support part through contact therewith while the tape cassette is mounted in the mounting compartment. The second receiving part is configured to be supported by the second support part through contact therewith while the tape cassette is mounted in the mounting compartment. The contact part is configured to contact a restriction part of the cover while the tape cassette is mounted in the mounting compartment and the cover is in the closed state. The output gear is rotatable about an output-gear axis parallel to the mounting direction. The output gear is configured to mesh with the platen gear at a mesh point to transmit a driving force from an outside of the tape cassette to the platen gear while the tape cassette is mounted in the mounting compartment. The output gear and the platen gear are helical gears configured such that a thrust load is applied to the output gear at the mesh point while the output gear and the platen gear meshing each other are rotating. While the tape cassette is mounted in the mounting compartment, the contact part is positioned in a region that is on an opposite side of an axis from the mesh point when viewed in the mounting direction, the axis passing through the receiving part and the second receiving part. While the tape cassette is mounted in the mounting compartment, the contact part is configured to contact the restriction part of the cover in the closed state to restrict the tape cassette from rotating about the axis by the thrust load applied on the output gear.

The output gear in the tape cassette is meshed with the platen gear in the printing device and transmits a drive force for rotating the platen roller. The output gear is a helical gear configured such that a thrust load is applied thereto in the mounting direction at the mesh point between the platen gear and output gear. Accordingly, the tape cassette is urged to rotate about the axis passing through the first and second receiving parts such that the output gear (at the mesh point) moves in the mounting direction. Hence, the area on the opposite side of the axis from the output gear (the mesh point) is urged to move in a direction opposite the mounting direction. However, the restriction part provided on the cover in this area contacts the other end portion of the tape cassette to restrict the tape cassette from rotating about the axis. Hence, the other end portion of the tape cassette is restrained by the restriction part from moving while the printing device is driving, thereby stabilizing the orientation of the tape cassette and preventing deviation in the position of the printing tape drawn out of the tape cassette.

DESCRIPTION

Figure 1:
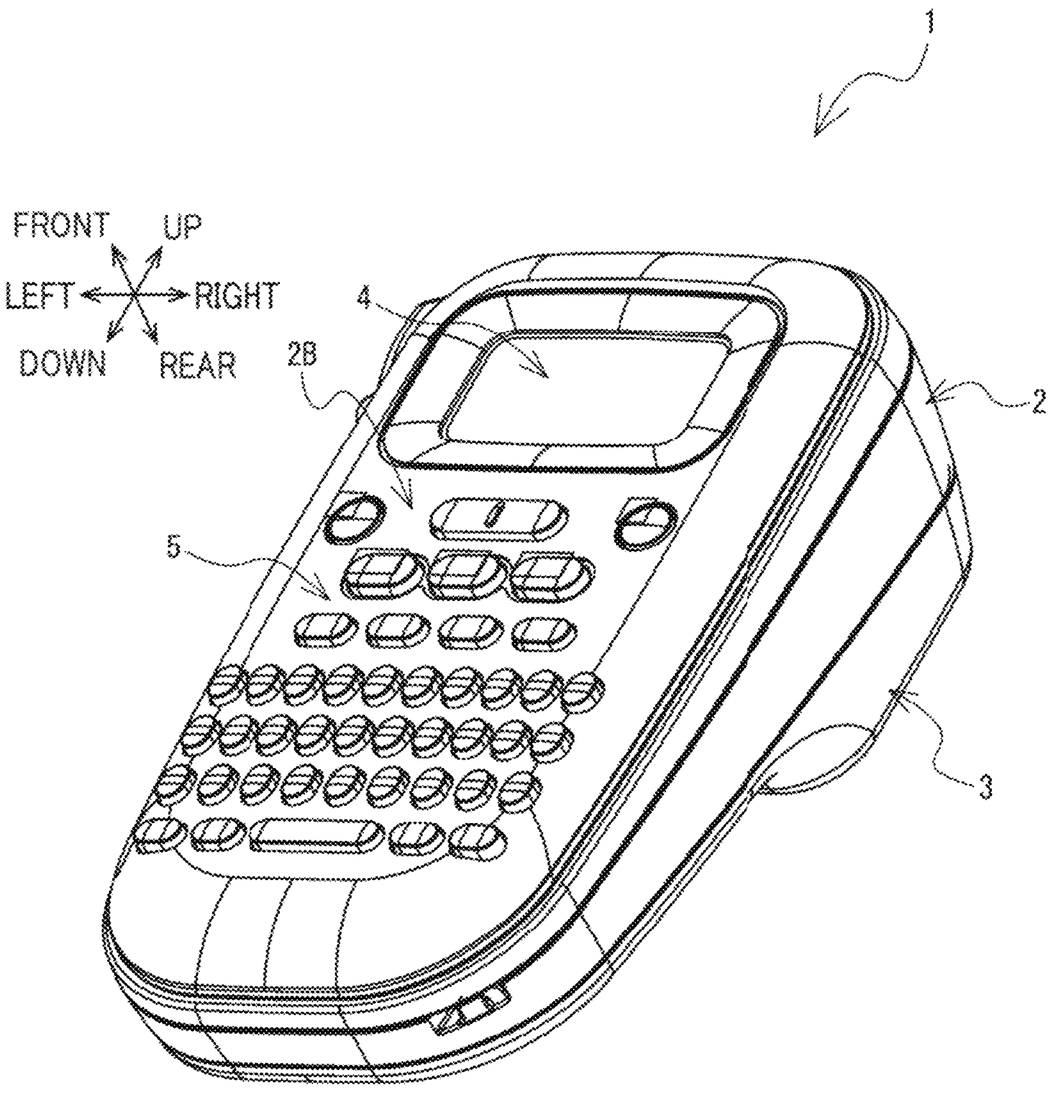
FIG. 1 is a perspective view of a printing device 1 as viewed from a lower-right-front side thereof.

Hereinafter, a printing device 1 and a tape cassette 100 according to an embodiment of the present disclosure will be described while referring to FIGS. 1 through 15.

In the following description, directions parallel to an axis of a drive shaft 63 (see FIG. 6) in the printing device 1 will be called a front-rear direction. Of the directions perpendicular to the front-rear direction, the directions parallel to a discharge direction of a tape 101 along a discharge channel 29 will be called an up-down direction, and the directions perpendicular to both the front-rear direction and the up-down direction will be called a left-right direction. Specifically, the upper-right side, lower-left side, left side, right side, upper-left side, and lower-right side in FIG. 1 will respectively be called the top side, bottom side, left side, right side, front side, and rear side of the printing device 1. Directions relative to the tape cassette 100 will correspond to the above directions with respect to the printing device 1 in which the tape cassette 100 is mounted, regardless of whether the tape cassette 100 is actually mounted in the printing device 1 or not. Specifically, the lower-left side, upper-right side, upper-left side, lower-right side, lower side, and upper side in FIG. 2 will respectively correspond to the top side, bottom side, left side, right side, front side, and rear side of the tape cassette 100.

A configuration of the printing device 1 will be described.

Figure 2:
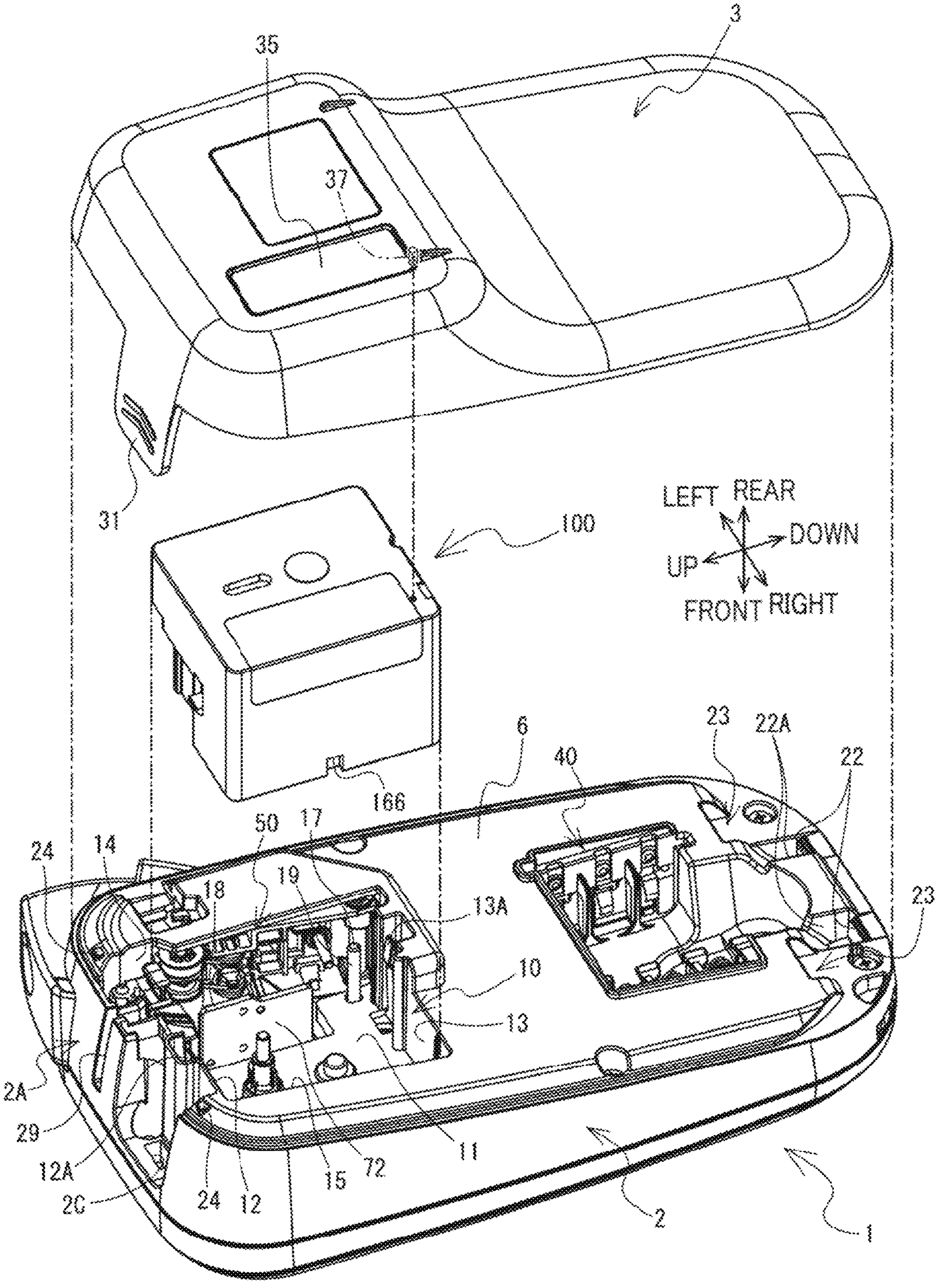
FIG. 2 is a perspective view of the printing device 1 as viewed from an upper-right-rear side thereof in a state where a rear cover 3 is removed.
Figure 3:
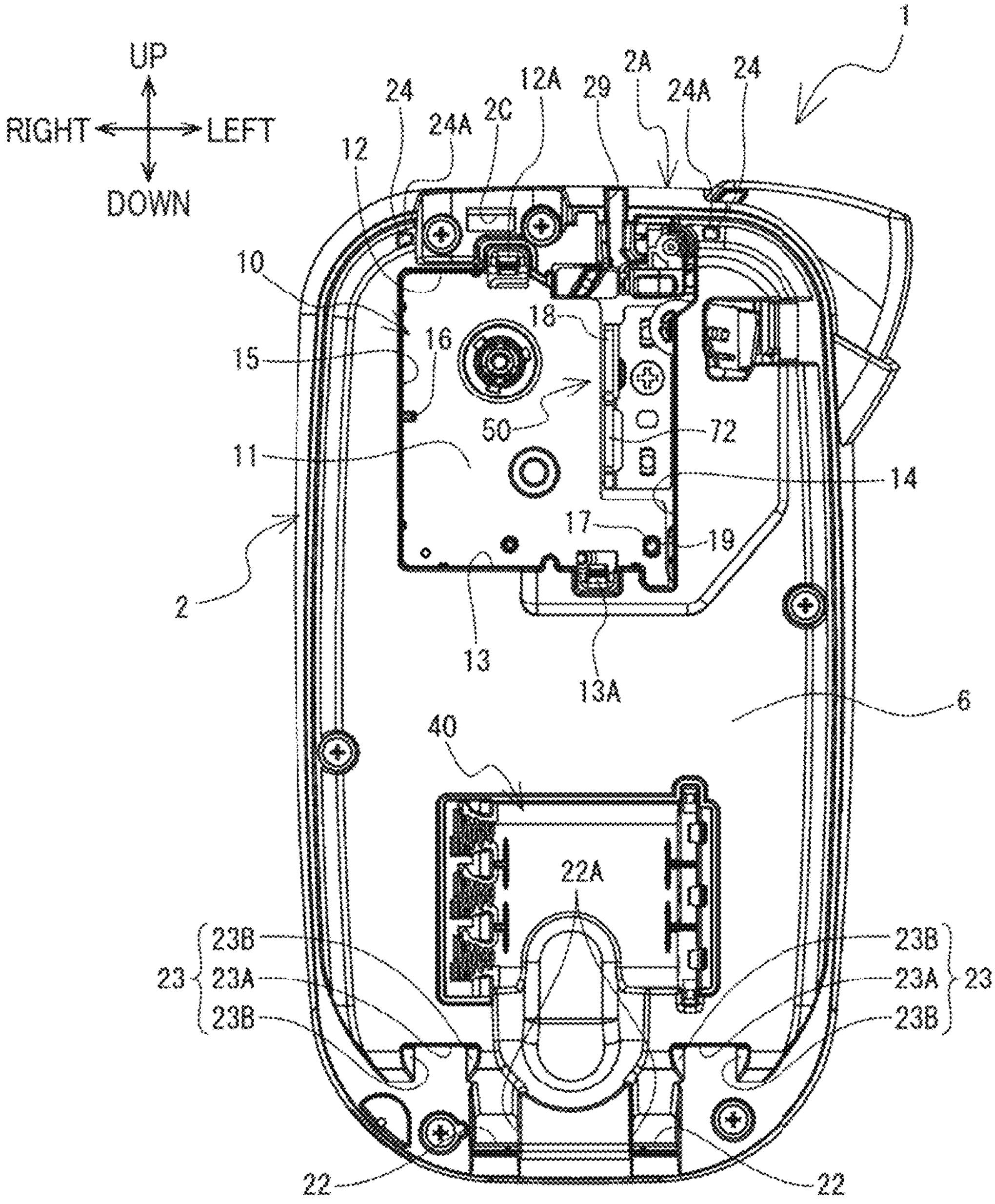
FIG. 3 is a rear view of a housing 2 of the printing device 1.
Figure 4:
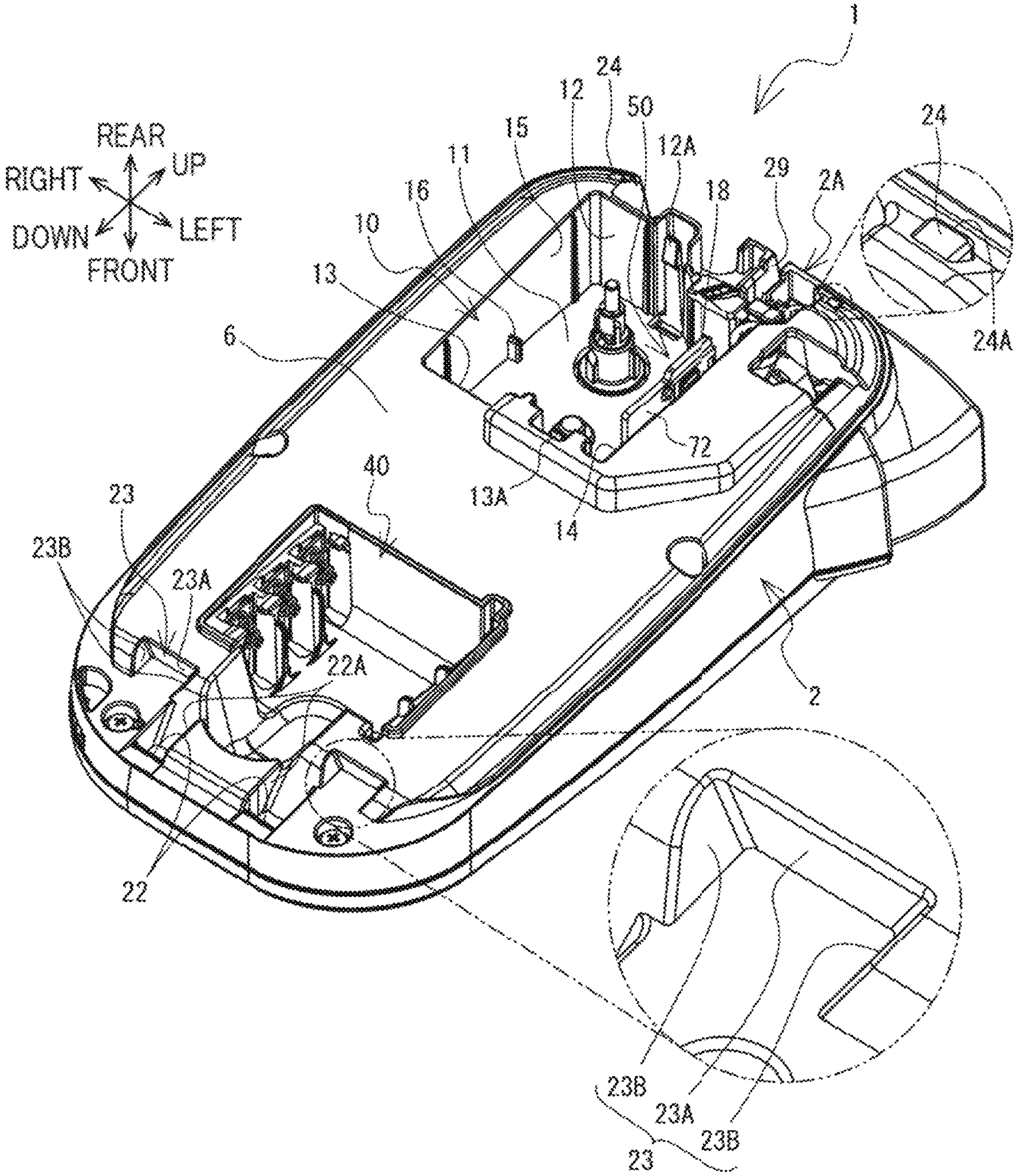
FIG. 4 is a perspective view of the housing 2 as viewed from a lower-left-rear side thereof.
Figure 5:
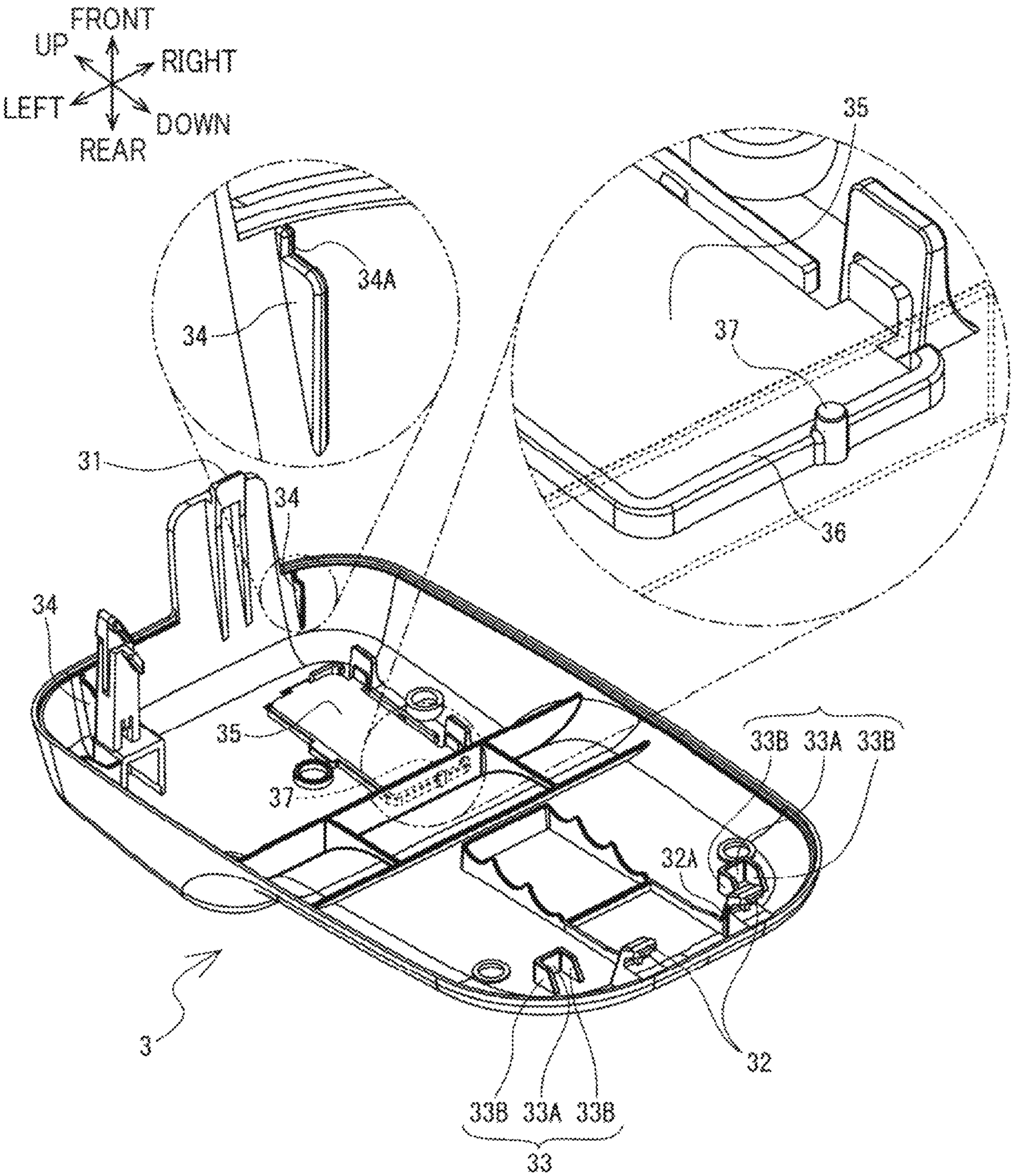
FIG. 5 is a perspective view of the rear cover 3 as viewed from a lower-left-front side thereof.

As shown in FIG. 1, the printing device 1 is a portable label printer that can create labels by printing images on the tape 101 (see FIG. 11) drawn out from the tape cassette 100 (see FIG. 2). The printing device 1 is configured to print images such as text and graphics on the tape 101.

As shown in FIGS. 1 through 5, the printing device 1 includes a housing 2, a rear cover 3, a display unit 4, and an input unit 5.

The housing 2 has a box shape that is elongated in the up-down direction and has an opening on the rear side. An inner cover 6 is assembled over the opening of the housing 2 to protect an interior of the housing 2. The housing 2 has a top wall 2A in which a discharge channel 29 and an anchoring hole 2C are formed. The discharge channel 29 penetrates the top wall 2A in the up-down direction. The anchoring hole 2C is engageable with an opening/closing part 31 (described below) of the rear cover 3.

The rear cover 3 is removably mounted on the housing 2. The rear cover 3 has a concave shape that is elongated in the up-down direction and that is recessed rearward. When mounted on the housing 2, the rear cover 3 covers the entire rear surface of the housing 2 including the opening formed in the rear side as well as the inner cover 6. The rear cover 3 has a pair of engaging pawls 32, the opening/closing part 31, a pair of guiding pawls 33, a pair of positioning ribs 34, a window 35, and a restriction part 37.

The engaging pawls 32 are provided on an inner surface of the recessed portion of the rear cover 3 positioned near a bottom end thereof. The engaging pawl 32 are positioned apart from each other in the left-right direction. Each engaging pawl 32 is formed in a hook shape that protrudes forward and then bends downward. The inner cover 6 in the housing 2 has a pair of engagement holes 22 in a bottom edge thereof. The engagement holes 22 are formed at positions separated in the left-right direction and are recessed downward. When mounting the rear cover 3 on the housing 2, the engaging pawls 32 are inserted into the respective engagement holes 22. The engaging pawls 32 function as a fulcrum of pivoting the rear cover 3 open and closed when the rear cover 3 is mounted and removed. Each engaging pawl 32 has a rib 32A on an inner left-right side thereof. The ribs 32A extend in the front-rear direction. When mounting the rear cover 3 on the housing 2, the ribs 32A contact side surfaces 22A of the respective engagement holes 22. By interposing the side surfaces 22A of the engagement holes 22 between the ribs 32A of the engaging pawls 32, the rear cover 3 can be fixed in position relative to the housing 2 in the left-right direction. Since the area of contact between the ribs 32A and the side surfaces 22A is small, this contact does not hinder pivoting of the rear cover 3 when mounted.

The opening/closing part 31 is a portion that protrudes forward from an upper edge of the rear cover 3. The opening/closing part 31 has a distal end that is formed as a hook. The opening/closing part 31 is configured to engage in the anchoring hole 2C formed in the top wall 2A of the housing 2. When the rear cover 3 is mounted on the housing 2, the opening/closing part 31 functions to secure that the rear cover 3 does not come off the housing 2. The rear cover 3 can be detached from the housing 2 by pressing the opening/closing part 31 downward while the rear cover 3 is in a mounted state and pivoting the top of the rear cover 3 rearward about the engaging pawls 32.

The guiding pawls 33 are provided on the bottom end of the rear cover 3 at positions above the corresponding engaging pawls 32 and outward of the corresponding engaging pawls 32 in the left-right direction. The guiding pawls 33 protrude forward from the inner surface of the rear cover 3 in a rib-like shape. Each guiding pawl 33 has a top plate 33A, and a pair of side plates 33B extending downward from respective edges of the top plate 33A. Each side plate 33B has a bottom portion that slopes as protruding downward. The guiding pawls 33 function to guide a pair of corresponding guiding recesses 23 formed in the inner cover 6 when the rear cover 3 is mounted on the housing 2 so that the orientation of the rear cover 3 is aligned with the orientation of the housing 2.

The guiding recesses 23 are provided in a bottom end portion of the inner cover 6 at positions above the corresponding engagement holes 22 and outward of the corresponding engagement holes 22 in the left-right direction. Each guiding recess 23 has a top surface 23A that faces downward and opposes the top plate 33A of the corresponding guiding pawl 33 when the rear cover 3 is mounted on the housing 2, and a pair of side surfaces 23B that face inward and oppose the corresponding pair of side plates 33B in the left-right direction. The side surfaces 23B are sloped relative to the front-rear direction so as to face obliquely rearward. That is, the side surfaces 23B are tapered relative to each other, growing farther apart toward the rear and closer toward the front. The side surfaces 23B function to guide the side plates 33B of the guiding pawls 33 toward a center in the left-right direction between the side surfaces 23B, thereby positioning the rear cover 3 relative to the housing 2 in the left-right direction. This configuration can reduce play in the rear cover 3 in the left-right direction when the rear cover 3 is mounted and can stabilize the rear cover 3 in the mounted state.

The guiding pawls 33 are provided near the corresponding engaging pawls 32, which serve as the fulcrum of pivoting of the rear cover 3 when the rear cover 3 is mounted on the housing 2. With this configuration, the rear cover 3 begins to pivot about the engaging pawls 32 when being mounted on the housing 2 and, before the opening/closing part 31 is inserted into the anchoring hole 2C, the left-right position of the rear cover 3 relative to the housing 2 is corrected by the guiding pawls 33 and guiding recesses 23. Accordingly, the hook of the opening/closing part 31 is smoothly inserted into the anchoring hole 2C, facilitating mounting of the rear cover 3 in the printing device 1. Incidentally, the pair of side surfaces 23B on the guiding recess 23 may be configured such that one is a sloped surface while the other is a vertical surface. In this case, if one side surface 23B (e.g., the left side surface 23B) in one of the pair of guiding recesses 23 is a sloped surface, the other side surface 23B (e.g., the right side surface 23B) in the other guiding recess 23 should be made a sloped surface.

The positioning ribs 34 are provided on the inner surface of an upper peripheral wall forming the recessed portion in the rear cover 3. The positioning ribs 34 are positioned apart from each other in the left-right direction. Each positioning rib 34 has a plate shape that extends in the front-rear direction and protrudes downward from the inner surface of the peripheral wall. Each positioning rib 34 has a front edge that is stepped in the up-down direction to form a downward-facing positioning surface 34A. When mounting the rear cover 3, the positioning surfaces 34A of the positioning ribs 34 contact corresponding reference surfaces 24A of a pair of positioning protrusions 24 formed on the inner cover 6, thereby functioning to position the rear cover 3 relative to the housing 2 in the up-down direction. The positioning protrusions 24 are provided on the upper edge of the inner cover 6 at positions separated in the left-right direction and protrude rearward therefrom. The reference surfaces 24A form top surfaces of the respective positioning protrusions 24. The reference surfaces 24A are flat and face upward so as to be orthogonal to the up-down direction. When the rear cover 3 is mounted, the positioning surfaces 34A of the positioning ribs 34 contact the reference surfaces 24A of the positioning protrusions 24, thereby aligning the up-down position of the rear cover 3 with that of the housing 2 while eliminating play.

The window 35 is positioned in an upper-right portion of the rear cover 3. The window 35 allows the interior of the housing 2 to be visible from outside. The window 35 is positioned to be aligned with a right end portion of a cassette mounting compartment 10 described later. When the tape cassette 100 is mounted in the cassette mounting compartment 10, the user can see a label affixed to the rear surface of the tape cassette 100 through the window 35. The label specifies the type of tape and the like in the tape cassette 100. The window 35 is fitted in a window frame 36 to be secured to the rear cover 3. The window frame 36 surrounds the window 35 on the top, bottom, left and right sides. The restriction part 37 is formed on the bottom edge of the window frame 36 at a position near a left-right center thereof. The restriction part 37 protrudes forward from the window frame 36. The restriction part 37 is rod-shaped and is integrally formed with the window frame 36. The restriction part 37 is arranged at a position for overlapping in the front-rear direction with a lower-right corner of a rear wall 195 of the tape cassette 100 when the tape cassette 100 is mounted in the cassette mounting compartment 10 (see FIG. 15), as will be described later. The restriction part 37 does not contact the rear wall 195 of the tape cassette 100 when the printing device 1 is not driving. When the printing device 1 is driving, the drive force transmitted to a platen roller 82 (described later) produces a thrust load that causes the tape cassette 100 to tilt and bring the restriction part 37 into contact with the rear wall 195.

The display unit 4 is a liquid crystal display, for example, and can display various information thereon. The display unit 4 is disposed on a front surface 2B of the housing 2 at a position above an approximate center of the front surface 2B in the up-down direction. The input unit 5 is configured to accept various information inputted through user operations. The input unit 5 is disposed on the front surface 2B of the housing 2 below the display unit 4. The input unit 5 includes various keys such as character keys, a Print button, and an Esc key.

As shown in FIGS. 2 through 5, the printing device 1 further includes the cassette mounting compartment 10, a battery accommodating section 40, and a printing unit 50 provided inside the housing 2. The tape cassette 100 is detachably mounted in the cassette mounting compartment 10.

The cassette mounting compartment 10 is formed in the inner cover 6 on the rear side of the housing 2 at a position above the center of the same in the up-down direction. The cassette mounting compartment 10 has a concave shape that is recessed forward. The cassette mounting compartment 10 has a recess bottom surface 11, and recess peripheral surfaces 12-15 formed continuously with four edges of the recess bottom surface 11 to surround the same in the up-down and left-right directions.

The cassette mounting compartment 10 includes hooks 12A and 13A that extend rearward from the recess bottom surface 11 along the upper recess peripheral surface 12 and lower recess peripheral surface 13, respectively. Distal end portions of the respective hooks 12A and 13A can flex in the up-down direction. The hooks 12A and 13A are engageable with engaging protrusions 162 and 163 (see FIG. 13) formed respectively on an upper wall 191 and a lower wall 192 of the tape cassette 100 when the tape cassette 100 is mounted in the cassette mounting compartment 10 to maintain the tape cassette 100 in the mounted state.

The cassette mounting compartment 10 also has three support parts 16, 17, and 18 that are configured to support the tape cassette 100 mounted in the cassette mounting compartment 10 toward the rear.

The support part 16 is provided on the right recess peripheral surface 15 at an approximate center thereof in the up-down direction. The support part 16 has a rib shape that extends rearward from the recess bottom surface 11. The support part 16 has a length in the front-rear direction (from the recess bottom surface 11 toward the rear) that is approximately one-fourth a dimension in the front-rear direction of the right recess peripheral surface 15. When the tape cassette 100 is mounted in the cassette mounting compartment 10, the support part 16 contacts a receiving part 166 (see FIG. 13) formed on a right wall 194 of the tape cassette 100 to support the tape cassette 100 from its front side.

The support part 17 is provided at near a corner of the cassette mounting compartment 10 where the left recess peripheral surface 14 connects to the lower recess peripheral surface 13. The support part 17 is a rear end of a metal pin 19. The pin 19 has a rod-shape that extends rearward from the recess bottom surface 11. The pin 19 is provided on a base 51 (see FIGS. 6 and 7) of the printing unit 50. The pin 19 penetrates through an opening formed in the recess bottom surface 11 and is exposed inside the cassette mounting compartment 10. The pin 19 has a length in the front-rear direction (from the recess bottom surface 11 toward the rear) that is approximately three-fourths a dimension in the front-rear direction of the lower recess peripheral surface 13. When the tape cassette 100 is mounted in the cassette mounting compartment 10, the support part 17 contacts a receiving part 167 (see FIG. 13) provided in a corner area formed by a left wall 193 and the lower wall 192 of the tape cassette 100 to support the tape cassette 100 from the front side thereof.

The support part 18 is a rear surface of an upper end portion of a heat sink 72. The support part 18 is positioned near a corner formed where the left recess peripheral surface 14 connects to the upper recess peripheral surface 12. The support part 18 of the heat sink 72 is positioned away rearward from the recess bottom surface 11 by a distance that is slightly greater than approximately three-fourths a front-rear dimension of the lower recess peripheral surface 13. When the tape cassette 100 is mounted in the cassette mounting compartment 10, the support part 18 contacts a receiving part 168 (see FIG. 13) in an upper end portion of a head opening 123 formed in the tape cassette 100 and supports the tape cassette 100 from the front side. The head opening 123 is a space in the tape cassette 100 through which the heat sink 72 and a print head 71 are inserted when mounting the tape cassette 100 in the printing device 1.

The battery accommodating section 40 is configured to accommodate a battery (not shown) therein. The battery accommodating section 40 is formed in the inner cover 6 on the rear side of the housing 2. The battery accommodating section 40 has a concave shape that is recessed forward from the inner cover 6 at a position below the center of the housing 2 in the up-down direction. When the rear cover 3 is removed from the housing 2, the cassette mounting compartment 10 and the battery accommodating section 40 are exposed on the outside of the printing device 1 through the opening in the rear side of the housing 2. While the rear cover 3 is removed from the housing 2, the user can replace both the tape cassette 100 and the battery.

Figure 6:
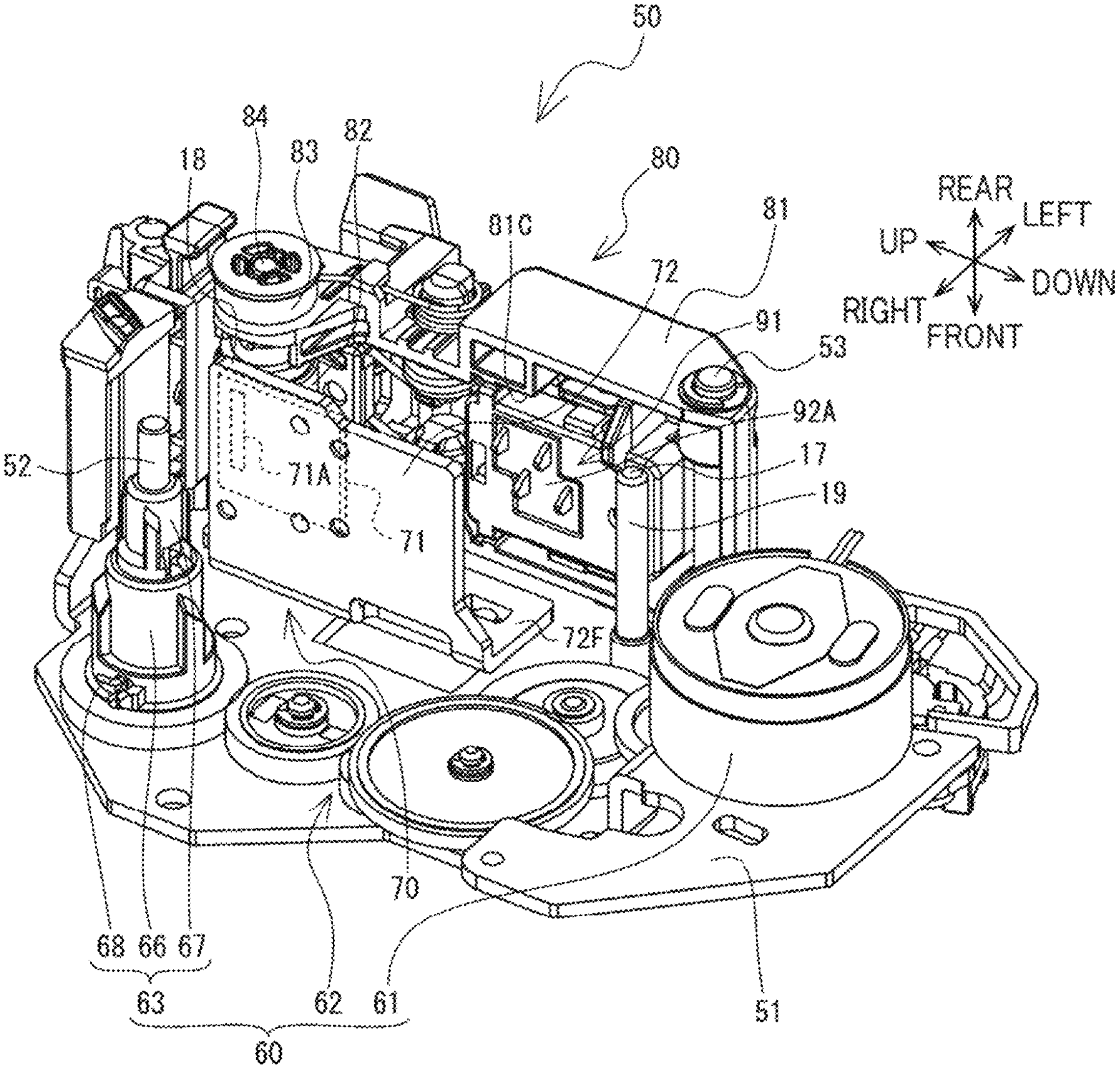
FIG. 6 is a perspective view of a printing unit 50 in the printing device 1.

The printing unit 50 is configured to perform printing on the tape 101. The printing unit 50 is disposed in an upper portion of the housing 2, and specifically in a front-left section in the cassette mounting compartment 10. As shown in FIG. 6, the printing unit 50 includes the base 51, a drive mechanism 60, a head unit 70, and a platen unit 80.

Figure 7:
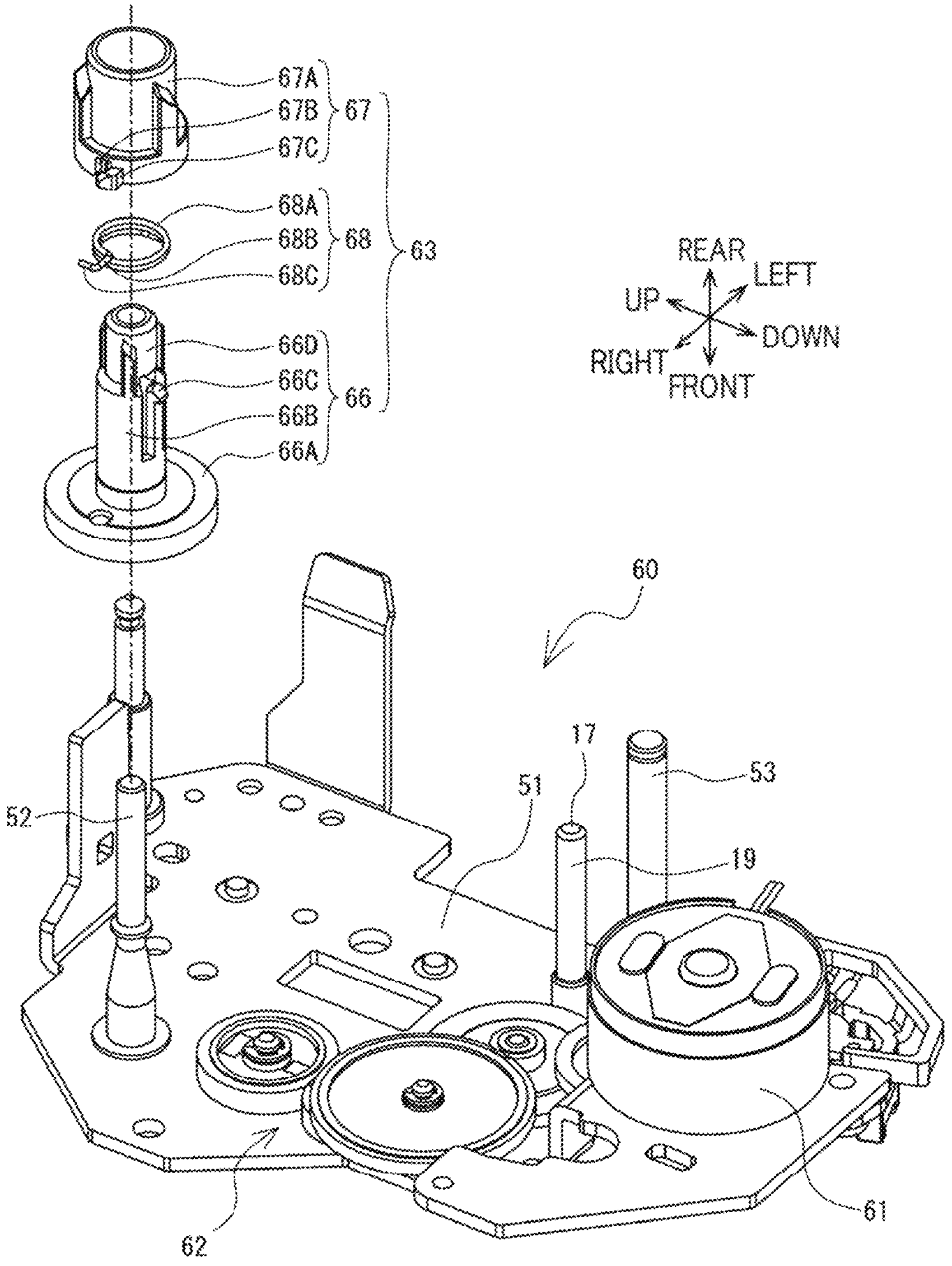
FIG. 7 is a perspective view of a drive mechanism 60 in the printing device 1.

As shown in FIGS. 6 and 7, the drive mechanism 60 includes a motor 61, a gear train 62, and the drive shaft 63 that are mounted on the base 51. The base 51 is a metal plate that supports the components of the printing unit 50. Plate surfaces of the base 51 face in the front-rear direction, and the base 51 extends longer in the up-down direction than in the left-right direction. The motor 61 is a drive source disposed on a lower end portion of the base 51. The gear train 62 is configured of a plurality of gears coupled together and is arranged on the base 51. The drive shaft 63 is disposed on an upper-right portion of the base 51. A drive force of the motor 61 is configured to be transmitted to the drive shaft 63 through the gear train 62. The motor 61, gear train 62, and base 51 are arranged inside the housing 2 on the front side of the inner cover 6. The drive shaft 63 passes through an opening formed in the recess bottom surface 11 and is exposed inside the cassette mounting compartment 10.

The drive shaft 63 is designed to be inserted into a take-up spool 107 and an input gear 134 (see FIG. 12) of the tape cassette 100 when the tape cassette 100 is mounted in the cassette mounting compartment 10. The drive shaft 63 is configured to input the drive force into the tape cassette 100 for rotating the take-up spool 107 and input gear 134. A rotary shaft 52 of the drive shaft 63 is provided on an upper-right end portion of the base 51. The rotary shaft 52 extends rearward from the base 51 parallel to the front-rear direction.

The drive shaft 63 includes a transmission cam gear 66, a clutch spring 68, and a ribbon cam 67. The transmission cam gear 66 is a component that integrates a gear and a cam. The gear receives the drive force transmitted from the motor 61 and inputted via the gear train 62, and the cam transmits the drive force to the input gear 134. The transmission cam gear 66 has a gear part 66A, a shaft part 66B, a hook 66C, and a cam part 66D. The gear part 66A is a gear portion that meshes with a downstream-most gear of the gear train 62. The drive force from the motor 61 is inputted into the gear part 66A. The shaft part 66B has a cylindrical shape that extends rearward from the gear part 66A. The shaft part 66B has a smaller diameter than the gear part 66A and is rotatable together with the gear part 66A about the rotary shaft 52. The hook 66C is provided on a rear end of the shaft part 66B. The hook 66C fixes the position of the ribbon cam 67 provided around the shaft part 66B and prevents the ribbon cam 67 from coming off the shaft part 66B. The cam part 66D is a portion of the transmission cam gear 66 that is to be inserted into the input gear 134. The cam part 66D is provided on the rear end of the shaft part 66B and is configured to transmit the drive force from the motor 61 to the input gear 134.

The clutch spring 68 is a coil spring having an annular part 68A, an anchoring part 68B, and a bent end 68C. The annular part 68A is a coil-like portion mounted over an outer circumferential surface of the shaft part 66B in the transmission cam gear 66. The anchoring part 68B is a portion that extends radially outward from a rearmost turn of the annular part 68A. The bent end 68C is a portion that is connected to the end of the anchoring part 68B and that is bent in a circumferential direction of the annular part 68A. When the transmission cam gear 66 is urged to rotate in the same direction as the ribbon cam 67 takes up an ink ribbon 104, friction generated by the annular part 68A sliding against the shaft part 66B reduces the diameter of the annular part 68A so that the clutch spring 68 transmits the drive force of the transmission cam gear 66 to the ribbon cam 67. If the transmission cam gear 66 does not rotate even when the ribbon cam 67 is urged to rotate in the direction for taking up the ink ribbon 104, the diameter of the annular part 68A expands so that the clutch spring 68 does not transmit the drive force between the transmission cam gear 66 and ribbon cam 67. Therefore, the ribbon cam 67 can rotate freely to take up the ink ribbon 104.

The ribbon cam 67 is a cylindrical member having a cam part 67A, a groove part 67B, and a restriction part 67C. The cam part 67A is a portion configured to be inserted into the take-up spool 107 and is placed around the shaft part 66B. The cam part 67A is configured to transmit the drive force from the transmission cam gear 66 via the clutch spring 68 to the take-up spool 107. The groove part 67B is a groove formed in a front edge of the cam part 67A and radially connects the interior and exterior of the cylindrical cam part 67A. The anchoring part 68B of the clutch spring 68 is placed in the groove part 67B. The restriction part 67C is a protruding portion on the outer circumferential surface of the cam part 67A at a front edge thereof. The restriction part 67C protrudes from the outer circumferential surface of the cam part 67A at a position offset one side in the circumferential direction from an opening defined by the groove part 67B. The restriction part 67C restricts the orientation in which the clutch spring 68 can be assembled on the shaft part 66B by restraining the bent end 68C of the clutch spring 68 exposed from the groove part 67B from being placed on the restriction part 67C side of the groove part 67B.

In assembling of the printing unit 50 during a manufacturing process of the printing device 1, the drive shaft 63 is mounted on the base 51. Here, the operator first mounts the transmission cam gear 66 on the rotary shaft 52 on the base 51. Next, the operator mounts the clutch spring 68 around the shaft part 66B of the transmission cam gear 66 and then assembles the ribbon cam 67 over the shaft part 66B. At this time, the restriction part 67C will interfere with the bent end 68C if the clutch spring 68 is to be mounted in an incorrect orientation. Since the ribbon cam 67 cannot be placed into a position where the ribbon cam 67 can be hooked by the hook 66C in this case, the operator must reassemble the clutch spring 68. Once the clutch spring 68 is mounted on the ribbon cam 67 in its proper orientation, the bent end 68C is arranged on a side of the groove part 67B where the restriction part 67C is not located. The ribbon cam 67 is then fitted around a base portion of the shaft part 66B in the transmission cam gear 66, so that the ribbon cam 67 does not come off the shaft part 66B by the hook 66C. Accordingly, the operator need not arrange the clutch spring 68 in the ribbon cam 67 temporarily before assembling the ribbon cam 67 together with the clutch spring 68 on the transmission cam gear 66, thereby avoiding assembly defects caused by the clutch spring 68 falling out during the assembling process.

Figure 8:
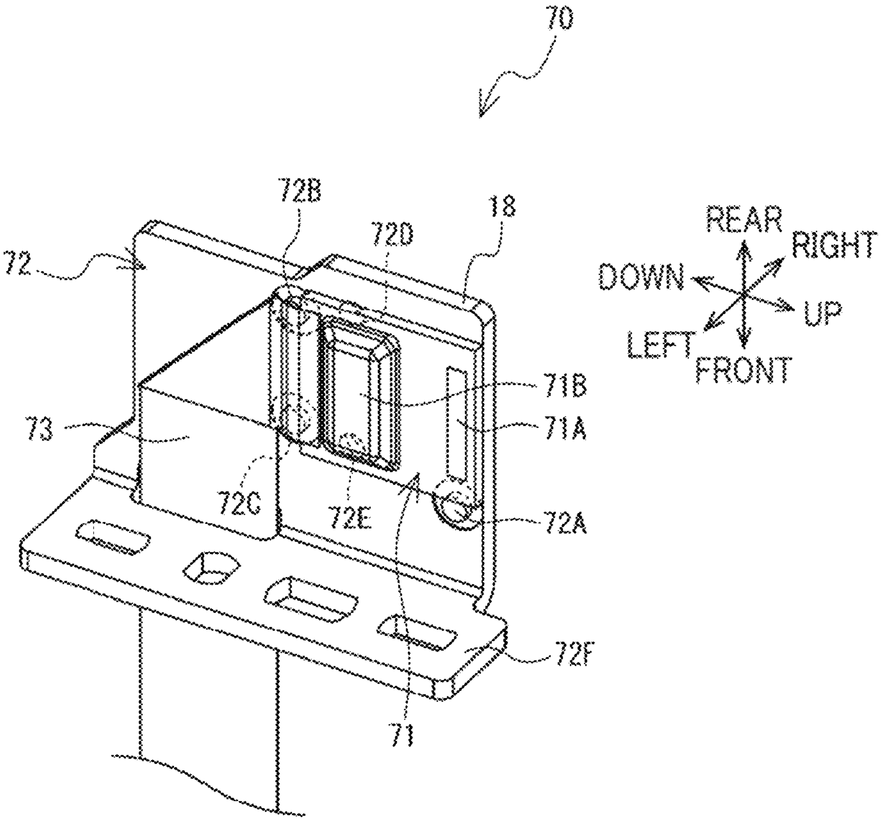
FIG. 8 is a perspective view of a head unit 70 in the printing device 1.

As shown in FIGS. 6 and 8, the head unit 70 includes the print head 71, the heat sink 72, and a harness 73. The head unit 70 is assembled to the base 51. The print head 71 is a rectangular circuit board on which a plurality of heating elements 71A and a driver circuit 71B are mounted. The heating elements 71A are arranged on a left surface of the circuit board and are aligned in the front-rear direction along an upper edge thereof. The driver circuit 71B is formed on the left surface of the circuit board near a lower edge thereof, and is electrically connected to a controller (not shown) in the housing 2 through the harness 73.

The heat sink 72 is a metal plate for holding and dissipating heat from the print head 71. The heat sink 72 extends longer in the up-down direction than the front-rear direction, with the plate surfaces facing in the left-right direction. Of the rear surface of the heat sink 72, an upper portion thereof protrudes farther rearward than a lower portion thereof. The rear surface of the upper portion of the heat sink 72 functions as the support part 18 when the tape cassette 100 is mounted in the printing device 1. The heat sink 72 has a front end portion 72F that is bent leftward. The heat sink 72 is disposed on an upper end portion of the base 51 to the left of the drive shaft 63, and the front end portion 72F is fixed to the base 51 with screws. The print head 71 and heat sink 72 pass through a cutout portion formed in a left end region of the recess bottom surface 11 and are exposed inside the cassette mounting compartment 10.

The print head 71 is fixed to the left surface of the heat sink 72 with adhesive. The heat sink 72 has three protruding parts 72A, 72B, and 72C that protrude from the left surface for fixing the position of the print head 71. The protruding parts 72A, 72B, and 72C are all formed by embossing. The protruding part 72A is formed in an upper end portion of the heat sink 72 at a position farther forward than a front-rear center of the same. The protruding part 72A contacts the front edge of the print head 71 on an upper end thereof to fix the positions of the heating elements 71A in a main scanning direction (the front-rear direction). This arrangement effectively allows the heat sink 72 to be made with a smaller front-rear dimension than if the protruding part 72A were provided near the rear edge of the heat sink 72 to contact the rear edge of the print head 71 for fixing the positions of the heating elements 71A in the main scanning direction. The protruding parts 72B and 72C are formed at positions closer to the center of the heat sink 72 in the up-down direction, with one positioned near the rear edge and one positioned near the front-rear center. The protruding parts 72B and 72C both contact the lower edge of the print head 71 to fix the positions of the heating elements 71A in a sub-scanning direction (the up-down direction).

The heat sink 72 also has two holes 72D and 72E that penetrate the heat sink 72 in the left-right direction at positions above the protruding parts 72B and 72C, respectively. The holes 72D and 72E are both formed at positions that overlap the right surface of the print head 71 when the print head 71 is fixed to the heat sink 72. In the assembly of the printing unit 50 during the manufacturing process of the printing device 1, the operator checks the bonding strength of the print head 71 by inserting a jig into the holes 72D and 72E after the print head 71 is bonded to the heat sink 72, thereby suppressing occurrence of assembly defects.

Figure 9:
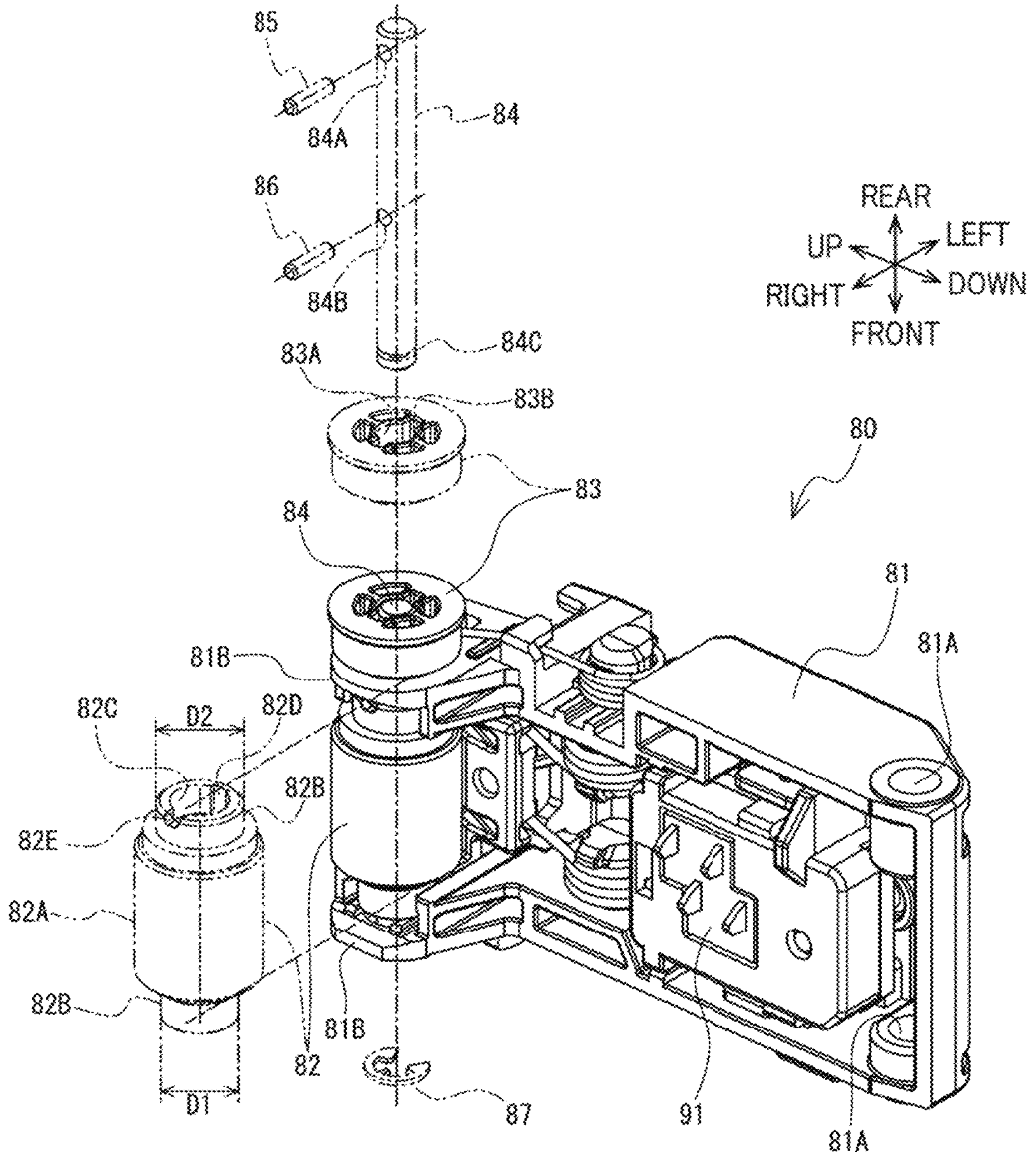
FIG. 9 is a perspective view of a platen unit 80 as viewed from a lower-right-rear side thereof.

As shown in FIGS. 6 and 9, the platen unit 80 is disposed on the left side of the cassette mounting compartment 10 (see FIG. 2). A lower end portion of the platen unit 80 is pivotably supported by a rotational shaft 53 so that an upper end portion of the platen unit 80 can pivot in the left-right direction. Note that, in FIG. 9, the parts prior to assembly are depicted with two-dot chain lines. The rotational shaft 53 for the platen unit 80 is provided on a lower-left end portion of the base 51 and extends rearward from the base 51 in the front-rear direction. By pivoting the platen unit 80, the platen roller 82 can move between an adjacent position (see FIG. 6) near the print head 71, and a separated position (see FIG. 3) separated from the print head 71. As a matter of convenience, directions in the following description related to the parts of the platen unit 80 will be based on the directions related to the parts in the printing device 1 when the platen roller 82 is in the adjacent position.

The platen unit 80 includes a platen holder 81, a platen shaft 84, the platen roller 82, a platen gear 83, and a detection part 91. The platen holder 81 has a box shape that is elongated in the up-down direction and that is open on the right side. Support holes 81A are formed as openings in respective front and rear walls of the platen holder 81 at a lower end thereof. The support holes 81A penetrate the front and rear walls in the front-rear direction. The support holes 81A support the rotational shaft 53 of the base 51. Each of the front and rear walls of the platen holder 81 has an expanded part 81B that expands rightward from an upper end of the corresponding front or rear wall. Each expanded part 81B has a through-hole (not shown) that penetrates the expanded part 81B in the front-rear direction. The through-holes are elongated in the left-right direction so that the platen roller 82 can move elastically leftward while being pressed rightward relative to the expanded part 81B. The platen holder 81 holds the platen roller 82 between the expanded parts 81B by rotatably supporting both ends of the platen shaft 84 in the through-holes formed in the expanded parts 81B.

The platen shaft 84 is a shaft member extending in the front-rear direction. The platen shaft 84 has insertion holes 84A and 84B formed respectively in a rear end portion and a center portion of the platen shaft 84 in the front-rear direction. The insertion holes 84A and 84B are provided for receiving engagement pins 85 and 86, respectively. The engagement pins 85 and 86 are rod members that extends longer than a diameter of the platen shaft 84. When inserted into the insertion holes 84A and 84B, the engagement pins 85 and 86 penetrate the platen shaft 84 in a radial direction of the same. A groove 84C is formed around a front end of the platen shaft 84. A retaining ring 87 is engaged with the groove 84C.

The platen roller 82 has a roller body 82A, and a roller sleeve 82B. The roller sleeve 82B is a cylindrical member into which the platen shaft 84 is inserted. The roller sleeve 82B has a front end whose outer diameter D1 is smaller than an outer diameter D2 of a remaining portion of the roller sleeve 82B, i.e., of a rear end and a center portion of the roller sleeve 82B where the roller body 82A is located. The expanded parts 81B on the front wall and rear wall of the platen holder 81 have portions that engage with an outer circumferential surface of the roller sleeve 82B at the front end and rear end, respectively. Therefore, the platen holder 81 is configured so that the platen roller 82 cannot be placed between the expanded parts 81B if the front-rear orientation of the platen roller 82 is reversed from the correct orientation.

The roller sleeve 82B has an inner peripheral surface defining a cylinder hole 82C. A pair of grooves 82D is formed in the inner peripheral surface defining the cylinder hole 82C to diametrically opposite each other. The engagement pin 86 at the center portion of the platen shaft 84 is engaged in the grooves 82D to transmit a torque from the platen shaft 84 to the roller sleeve 82B. Hence, the roller sleeve 82B is rotatable coaxially together with the platen shaft 84. A notch 82E is formed on the rear end of the roller sleeve 82B. The notch 82E radially penetrates the cylindrical wall of the roller sleeve 82B at a position aligned with the position of one of the grooves 82D. The roller body 82A is a cylindrical member that is fitted over the outer circumferential surface of the roller sleeve 82B at the center portion thereof. The roller body 82A is rotatable coaxially together with the platen shaft 84 and the roller sleeve 82B.

The platen gear 83 is fixed to the rear end of the platen shaft 84, which protrudes rearward from the expanded part 81B of the rear wall of the platen holder 81. The platen gear 83 is known as a helical gear whose gear teeth are skewed at a prescribed angle to a rotational axis L4 thereof (see FIG. 12). The platen gear 83 defines a through-hole 83A at a center thereof. A pair of grooves 83B is formed in an inner peripheral surface defining the through-hole 83A to diametrically oppose each other. The engagement pin 85 at the rear end of the platen shaft 84 is engaged in the grooves 83B to transmit the torque from the platen gear 83 to the platen shaft 84. Hence, the platen shaft 84 is rotatable coaxially together with the platen gear 83.

When the platen roller 82 is at the adjacent position, the tape 101 and ink ribbon 104 are nipped between the roller body 82A and the print head 71. The platen gear 83 is engaged with an output gear 131 (see FIG. 11) of the tape cassette 100. The drive force of the drive shaft 63 is inputted into the platen roller 82 via the tape cassette 100 (output gear 131) and the platen gear 83. Through the rotation of the platen roller 82, the roller body 82A conveys the tape 101 nipped between the roller body 82A and the print head 71 toward the discharge channel 29.

In the assembly of the platen unit 80 during the manufacturing process of the printing device 1, the platen roller 82 is assembled to the platen holder 81. To this end, the operator inserts the engagement pin 85 into the insertion hole 84A at the rear end of the platen shaft 84. The operator then inserts the platen shaft 84 into the through-hole 83A of the platen gear 83 from the rear side thereof and engages the engagement pin 85 in the grooves 83B once the platen shaft 84 has been inserted all the way up to the rear end. Next, the operator positions the platen roller 82 between the expanded parts 81B of the platen holder 81 in its correct front-rear orientation. Then while holding the platen gear 83, the operator inserts the engagement pin 86 into the insertion hole 84B formed in the platen shaft 84 and inserts the platen shaft 84 into the elongated through-hole formed in the rear expanded part 81B from the rear side thereof. Once the engagement pin 86 has passed through the elongated through-hole in the expanded part 81B of the rear wall, the operator can easily align the engagement pin 86 with the grooves 82D by observing the position of the engagement pin 86 through the notch 82E in the roller sleeve 82B. After engaging the engagement pin 86 in the grooves 82D, the operator continues to insert the platen shaft 84 until the front end of the platen shaft 84 is exposed outside the through-hole formed in the expanded part 81B of the front wall. The operator then fits the retaining ring 87 into the groove 84C on the front end of the platen shaft 84 to complete the assembly of the platen roller 82 to the platen holder 81. Since the platen roller 82, platen gear 83, and platen shaft 84 are positioned and secured by the engagement pins 85 and 86 and the retaining ring 87, each part constituting the platen unit 80 can be replaced independently as required if damage is incurred and reassembly of the platen unit 80 can be facilitated. Moreover, configuring the platen shaft 84 as a separate unit from the engagement pins 85 and 86 can keep production costs lower than if these parts are manufactured as a single unit through machining.

Figure 10:
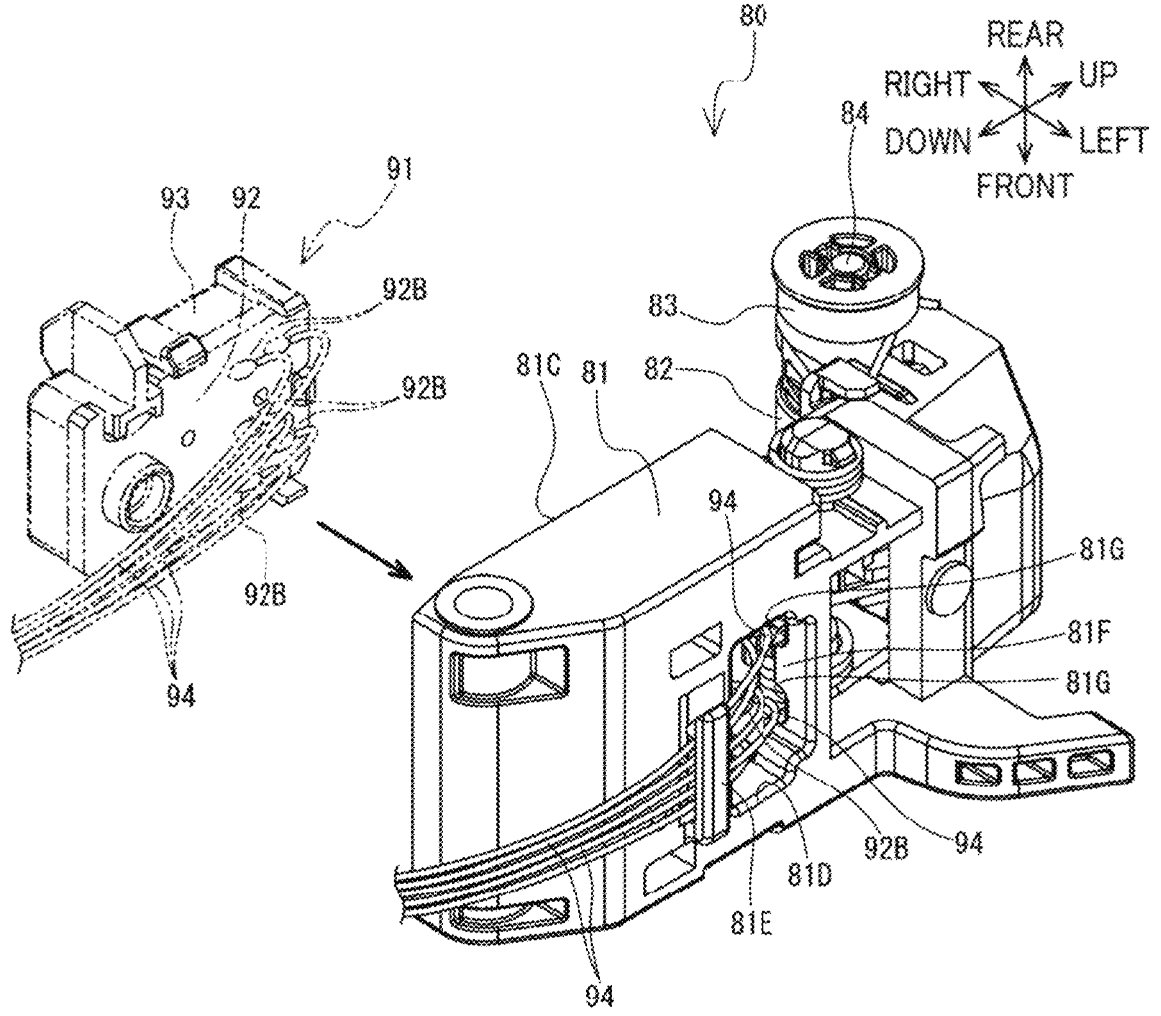
FIG. 10 is a perspective view of the platen unit 80 as viewed from a lower-left-rear side thereof.

As shown in FIGS. 6 and 10, the platen holder 81 has a concave holding section 81C between the front and rear walls at a position below a center thereof in the up-down direction. The detection part 91 is held in the holding section 81C. Note that, in FIG. 10, the detection part 91 prior to being assembled to the platen holder 81 is depicted with two-dot chain lines. The detection part 91 is a sensor configured to detect cassette identification information assigned to the tape cassette 100 from a detection part 125 (see FIG. 11) of the tape cassette 100 based on ON/OFF signals from mechanical switches. The detection part 91 has a circuit board 92, and a case 93. The circuit board 92 has a detector 92A mounted on a right surface thereof. The detector 92A includes a plurality of protruding switches configured to turn on when pushed inward. A plurality of lands 92B is mounted on a left surface of the circuit board 92. A plurality of signal lines 94 configured to transmit signals from the detector 92A to the controller (not shown) is connected to the lands 92B with solder. The lands 92B are formed in a group on an upper end of the circuit board 92.

The case 93 is box shaped. The case 93 is arranged inside the holding section 81C of the platen holder 81 and is secured with hooks. The circuit board 92 is fixed to a left surface of the case 93 with screws. The case 93 has a right surface that is at approximately the same left-right position as the right surface of the platen holder 81, while the switches of the detector 92A are exposed to the right therefrom.

The holding section 81C of the platen holder 81 has an opening 81D in the left surface thereof. The opening 81D is formed at a position corresponding to the area in which the lands 92B are formed. When the detection part 91 is retained in the holding section 81C, the lands 92B are exposed in the holding section 81C when viewed from the left through the opening 81D. The opening 81D is defined by inner walls extending in the left-right direction. The inner walls of the opening 81D include a top inner wall 81F. Notches 81G are formed at two locations in a right edge of the top inner wall 81F. The notches 81G are formed in positions corresponding to two of the lands 92B near the upper edge of the circuit board 92. The signal lines 94 are drawn through the opening 81D to the left side of the platen holder 81. A projected retainer 81E is formed on the left surface of the platen holder 81 below the opening 81D for holding the signal lines 94 in a bundle. The signal lines 94 drawn through the opening 81D are arranged between the left surface of the platen holder 81 and the projected retainer 81E.

The signal lines 94 are soldered to the lands 92B from above. Therefore, the signal lines 94 extend first upward from the corresponding lands 92B before being folded back downward and drawn downward through the opening 81D. The notches 81G formed in the top inner wall 81F of the opening 81D can reduce interference among the signal lines 94 that are folded back above the lands 92B. Therefore, the platen holder 81 can reduce load on the signal lines 94 caused by contact with the signal lines 94, reducing the occurrence of breakage among the signal lines 94. The platen holder 81 can also reduce the likelihood of displacement of the detector 92A due to pressure applied to the circuit board 92 from the signal lines 94 that contact with the platen holder 81. Further, since the platen holder 81 avoids interference with the signal lines 94, the platen holder 81 can be made more compact than if the platen holder 81 were formed larger in the left-right direction to keep the lands 92B away from the opening 81D.

Next, the configuration of the tape cassette 100 will be described.

The tape cassette 100 accommodates the tape 101 therein. As shown in FIG. 2, the tape cassette 100 can be mounted in and removed from the cassette mounting compartment 10 in the printing device 1. The tape cassette 100 can be interchanged to replenish the tape 101 and to change the type of tape 101 (e.g., the size, color, material, and the like).

Figure 11:
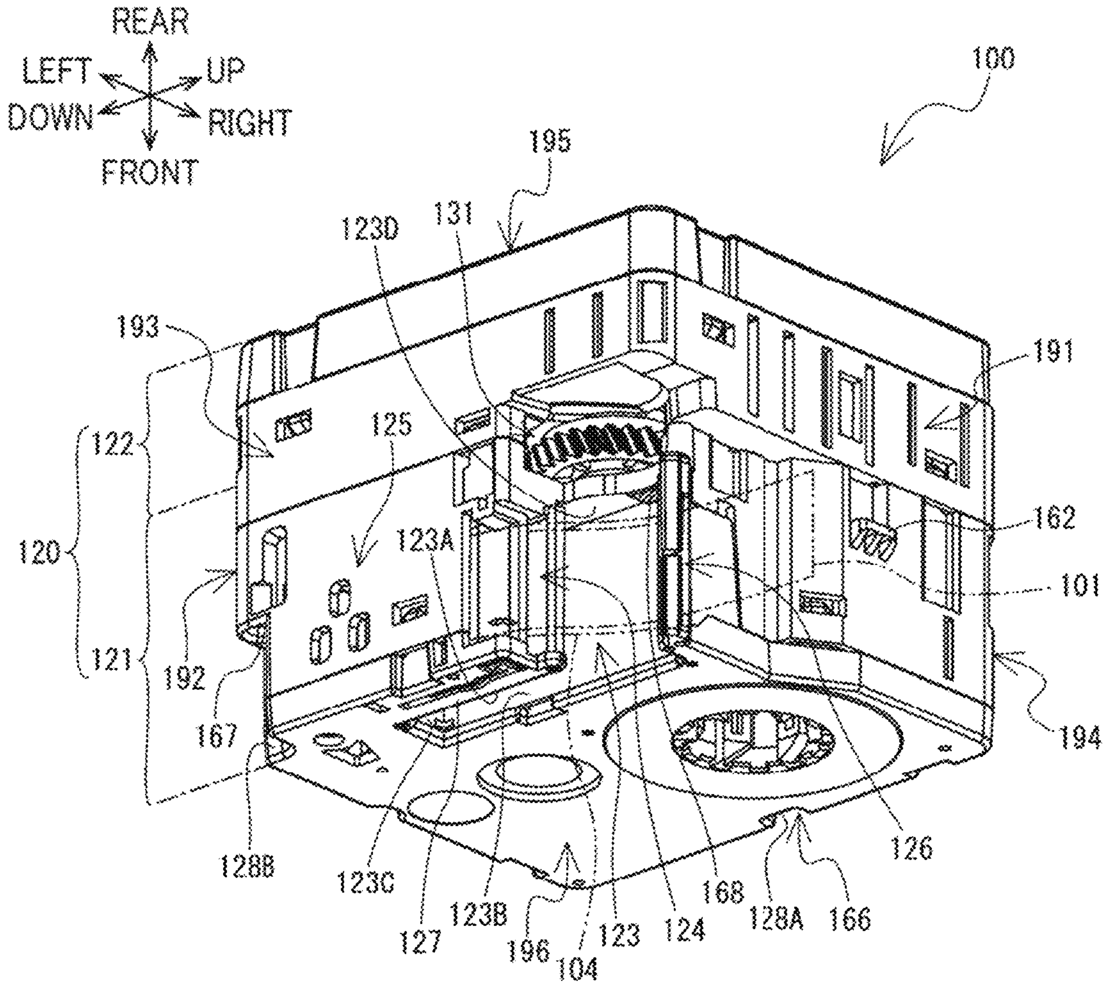
FIG. 11 is a perspective view of a tape cassette 100 as viewed from an upper-left-front side thereof.

As shown in FIG. 11, the tape cassette 100 includes a main case 120 that accommodates at least a part of the tape 101 and at least a part of the ink ribbon 104. The main case 120 is configured of a first case 121, and a second case 122. Each of the first case 121 and second case 122 is a rectangular parallelepiped with parallel sides aligned in the up-down direction, parallel sides aligned in the front-rear direction, and parallel sides aligned in the left-right direction. In other words, the main case 120 has a square outer shape when viewed in the front-rear direction.

The first case 121 is connected to the second case 122 so as to protrude forward from a front surface of the second case 122. The main case 120 is designed to be inserted into the cassette mounting compartment 10 with the first case 121 facing the recess bottom surface 11 (see FIG. 2) of the cassette mounting compartment 10.

Figure 12:
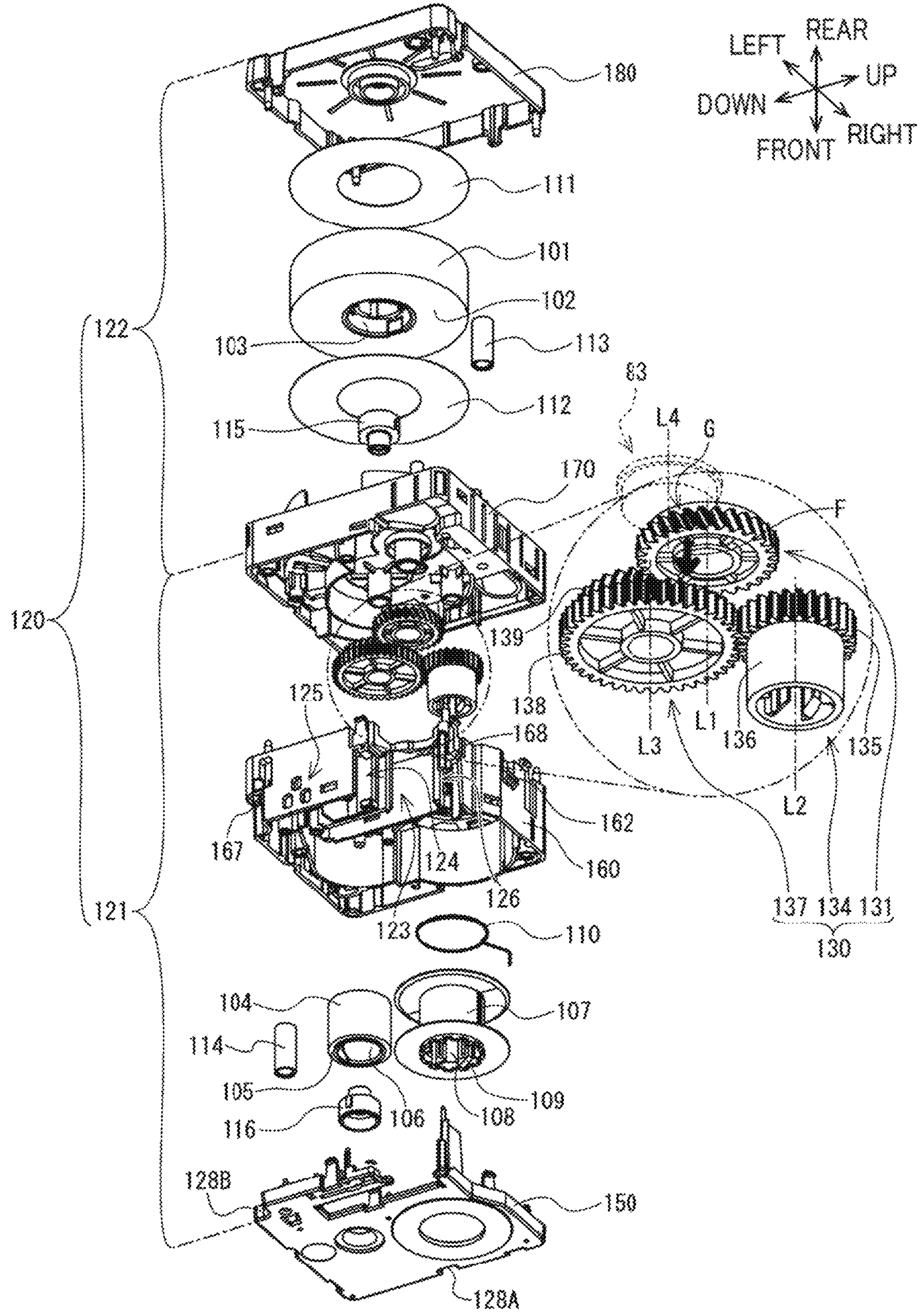
FIG. 12 is an exploded perspective view of the tape cassette 100.

As shown in FIG. 12, the tape cassette 100 also includes a tape roll 102, a tape spool 103, a ribbon roll 105, a ribbon spool 106, the take-up spool 107, and a drive transmission mechanism 130.

The tape roll 102 is configured of the strip-like tape 101 wound around the tape spool 103. Printing is performed on the tape 101. In the printing device 1, printing is performed on the tape 101 by heating the ink ribbon 104 with the heating elements 71A in the print head 71 and transferring ink from the ink ribbon 104 onto a surface of the tape 101. The tape roll 102 defines an axial center that is aligned in the front-rear direction.

Two spacer films 111 and 112 are arranged on respective rear and front outer sides of the tape roll 102 so as to sandwich the same. The spacer film 111 is disposed between the tape roll 102 and a second cover part 180, while the spacer film 112 is disposed between the tape roll 102 and a second frame part 170. The tape 101 drawn off the tape roll 102 is guided by a first roller 113 and a second roller 114.

The tape spool 103 is rotatable about a rotational axis aligned in the front-rear direction. The tape spool 103 supplies the tape 101 to the head opening 123 (see FIG. 11) by rotating as the platen roller 82 in the printing device 1 conveys the tape 101. The rotational axis of the tape spool 103 is aligned with the axial center of the tape roll 102. A clutch spring (not shown) held in a clutch spring holder 115 is configured to apply rotational resistance to the tape spool 103.

The ribbon roll 105 is configured of the strip-like ink ribbon 104 that has been wound around the ribbon spool 106. The ink ribbon 104 is used for printing the tape 101. The ink ribbon 104 is overlaid on the tape 101 in the head opening 123 and is used for printing by the print head 71. After being used for printing, the ink ribbon 104 is taken up on the take-up spool 107. The ribbon roll 105 is disposed at a different position from (and specifically farther forward than) the tape roll 102 with respect to the front-rear direction. The ribbon roll 105 is also at the same position as the head opening 123 in the front-rear direction.

The ribbon spool 106 is rotatable about a rotational axis. The rotational axis of the ribbon spool 106 is aligned in the front-rear direction. The ribbon spool 106 is configured to supply the ink ribbon 104 to the print head 71 by rotating as the take-up spool 107 takes up the ink ribbon 104. A clutch spring (not shown) held in a clutch spring holder 116 is configured to apply rotational resistance to the ribbon spool 106.

The take-up spool 107 is rotatable about a rotational axis. The rotational axis of the take-up spool 107 is parallel to the rotational axis of the ribbon spool 106. The take-up spool 107 is cylindrical and has a hollow space defined by an inner circumferential surface 108 thereof. Splines 109 are provided on the inner circumferential surface 108 of the take-up spool 107. The ribbon cam 67 of the drive shaft 63 is configured to be coupled with the splines 109 when the tape cassette 100 is mounted in the cassette mounting compartment 10. When rotated by the drive shaft 63, the take-up spool 107 takes up the used ink ribbon 104. A torsion spring 110 is configured to apply rotational resistance to the take-up spool 107. The torsion spring 110 is disposed between the take-up spool 107 and a first frame part 160.

When the tape cassette 100 is mounted in the cassette mounting compartment 10, the drive transmission mechanism 130 transmits the drive force received from the drive shaft 63 to the platen roller 82. The drive transmission mechanism 130 includes the output gear 131, the input gear 134, and an idle gear 137. The tape roll 102, drive transmission mechanism 130, and take-up spool 107 are arranged from the rear side toward the front side in this order.

The output gear 131 is an external gear provided for externally outputting the drive force for conveying the tape 101. By meshing with the platen gear 83, the output gear 131 transmits the drive force for conveying the tape 101 to the platen gear 83. The output gear 131 is a helical gear whose gear teeth are set at a prescribed angle (hereinafter called the "helix angle") to a rotational axis L1 thereof. The rotational axis L1 of the output gear 131 is parallel to a rotational axis L2 of the input gear 134 into which the drive shaft 63 is insertable as well as the rotational axis L4 of the platen gear 83.

When rotating, the output gear 131 generates a thrust load in a direction parallel to the rotational axis L1 of the output gear 131 (i.e., the front-rear direction). The direction of the thrust load is either forward or rearward and is determined by the rotating direction of the output gear 131 and the helix angle of its gear teeth. Specifically, the output gear 131 is a single helical gear with external teeth. The helix angle of the gear teeth of the output gear 131 generates a thrust load F at a mesh point G where the output gear 131 meshes with the platen gear 83. The thrust load F is generated in a direction for pushing the output gear 131 forward relative to the platen gear 83. In other words, the helix angle of the output gear 131 is set such that, when the output gear 131 rotates in the direction for transmitting the drive force to convey the tape 101 toward a draw-out area 124 (see FIG. 11) while meshed with the platen gear 83, the thrust load F is generated in such a direction that the main case 120 is mounted in the cassette mounting compartment 10 (i.e., the forward direction). The helix angle of the output gear 131 is between 20° and 30°, for example.

The platen gear 83 and platen roller 82 share the same rotational axis L4. Accordingly, the tape 101 is nipped between the platen roller 82 and the print head 71 and conveyed by the platen roller 82 at substantially the same position as the mesh point G when viewed from the rear. The direction in which the tape 101 is conveyed at the mesh point G when viewed from the rear is upward and substantially the same as the draw-out direction in which the tape 101 is drawn out of the tape cassette 100 through the draw-out area 124. That is, in a rear-side view, the platen roller 82 and platen gear 83 rotate clockwise while the output gear 131 rotates counterclockwise.

The rotational axis L4 of the platen gear 83 is parallel to the direction in which the tape cassette 100 is mounted in the cassette mounting compartment 10, and is orthogonal to the draw-out direction of the tape 101. Therefore, the helix angle of the gear teeth on the output gear 131 is set as follows for generating the thrust load F that pushes the output gear 131 forward (in the mounting direction) at the mesh point G. Specifically, the gear teeth at the mesh point G are angled such that an end of a gear tooth on the downstream side in the mounting direction (the front side) is positioned farther downstream (i.e., higher) in the draw-out direction (conveying direction) of the tape 101 than an end of the gear tooth on the upstream side in the mounting direction (the rear side). When the output gear 131 rotates, the surfaces of the gear teeth on the output gear 131 facing rearward and upward contact the surfaces of the gear teeth on the platen gear 83 facing forward and downward, and press the gear teeth of the platen gear 83 in the conveying direction of the tape 101 (upward) at the mesh point G. As a result, the output gear 131 generates the thrust load F acting in the mounting direction (forward) at the mesh point G.

As shown in FIG. 11, the output gear 131 is partially exposed in a space that is in communication with the head opening 123. The output gear 131 is engageable with the platen gear 83 in the space in communication with the head opening 123 while the tape cassette 100 is mounted in the cassette mounting compartment 10. The output gear 131 is disposed farther rearward than the detection part 125 formed on the left wall 193 of the main case 120 with respect to the front-rear direction and is disposed above the detection part

125 with respect to the up-down direction. The output gear 131 is also disposed between the tape roll 102 and the ribbon roll 105 in the front-rear direction.

As shown in FIG. 12, the input gear 134 is indirectly engaged with the output gear 131 through the idle gear 137 and is configured to transmit the drive force to the output gear 131. The input gear 134 has a gear portion 135 and a spool portion 136. The spool portion 136 is a cylindrical internal gear with splines provided on an inner circumferential surface thereof. The gear portion 135 is an external gear that meshes with an upstream gear 138 of the idle gear 137. The spool portion 136 is fixed to a front surface of the gear portion 135. When the tape cassette 100 is mounted in the cassette mounting compartment 10, the ribbon cam 67 of the drive shaft 63 is inserted into the spool portion 136 from the front side. The gear portion 135 is rotated together with the spool portion 136 by the drive force inputted into the spool portion 136. The rotational axis L2 of the input gear 134 is collinear with the rotational axis of the take-up spool 107 and is parallel to the rotational axis L1 of the output gear 131.

The rotational axis L2 of the input gear 134 is aligned in the front-rear direction with the hollow space in the take-up spool 107. Accordingly, the drive shaft 63 is simultaneously inserted into the take-up spool 107 and the input gear 134 while the tape cassette 100 is mounted in the cassette mounting compartment 10. As a result, the input gear 134, although not directly coupled with the take-up spool 107, is rotated together with the take-up spool 107 by the drive shaft 63.

The idle gear 137 meshes with the input gear 134 and the output gear 131 and is configured to transmit the drive force inputted into the input gear 134 to the output gear 131. The idle gear 137 is a stepped gear having the upstream gear 138 and a downstream gear 139 coaxially juxtaposed with each other. The upstream gear 138 is a spur gear with external teeth that mesh with the input gear 134. The downstream gear 139 is a helical gear with external teeth that mesh with the output gear 131. The gear teeth on the downstream gear 139 are skewed in an opposite manner to the gear teeth on the output gear 131. The downstream gear 139 has a smaller diameter than the upstream gear 138. Further, the downstream gear 139 is arranged closer to the tape roll 102 in the front-rear direction than the upstream gear 138 is to the tape roll 102.

The idle gear 137 is rotatable about a rotational axis L3 that is parallel to both the rotational axis L1 of the output gear 131 and the rotational axis L2 of the input gear 134. The idle gear 137 transmits the drive force inputted into the input gear 134 to the output gear 131 while reducing the rotational speed of the drive force. That is, the drive transmission mechanism 130 includes a reduction mechanism whose reduction ratio is a transmission ratio obtained by dividing the rotational speed of the input gear 134 by the rotational speed of the output gear 131.

The main case 120 includes a first cover part 150, the first frame part 160, the second frame part 170, and the second cover part 180. The first cover part 150 constitutes a front end portion of the tape cassette 100. The first frame part 160 is provided on the rear side of the first cover part 150 and is coupled to the first cover part 150 in the front-rear direction. The second frame part 170 is disposed on the rear side of the first frame part 160 and is coupled to the first frame part 160 in the front-rear direction. The second cover part 180 constitutes a rear end portion of the tape cassette 100. The second cover part 180 is coupled to the second frame part 170 in the front-rear direction.

The first cover part 150, first frame part 160, and a part of the second frame part 170 constitute the first case 121 that houses the ribbon roll 105, ribbon spool 106, take-up spool 107, and drive transmission mechanism 130. The first case 121 is disposed in a different position in the front-rear direction from the tape roll 102, more specifically, farther forward of the tape roll 102. The first case 121 has a discharge opening 126. The ribbon roll 105, ribbon spool 106, and take-up spool 107 are arranged in a space enclosed by the first cover part 150 and first frame part 160. The drive transmission mechanism 130 is arranged in the space enclosed by the first frame part 160 and second frame part 170.

The second cover part 180 and a remaining part of the second frame part 170 constitute the second case 122 that houses the tape roll 102. In other words, the tape roll 102 is disposed in a space enclosed by the second cover part 180 and second frame part 170.

As shown in FIG. 11, the main case 120 has the upper wall 191, lower wall 192, left wall 193, right wall 194, rear wall 195, and a front wall 196. The upper wall 191 and lower wall 192 constitute outer top and bottom walls of the main case 120 and extend in the front-rear direction and the left-right direction. The left wall 193 and right wall 194 constitute outer left and right walls of the main case 120 and extend in the up-down direction and the front-rear direction. The rear wall 195 and front wall 196 constitute outer rear and front walls of the main case 120 and extend in the left-right direction and the up-down direction.

The upper wall 191, lower wall 192, right wall 194, and rear wall 195 are plate-like members with a rectangular shape. The left wall 193 is a plate-like member with a substantially inverted L-shape having an opening in an upper-front corner thereof. The front wall 196 is a plate-like member with a substantially backward C-shape having a rectangular opening near a left edge thereof. The rectangular opening in the front wall 196 extends in the up-down direction from a position below a center of the front wall 196 to an upper edge of the same. The head opening 123 is formed in an upper-left-front portion of the main case 120 and communicates with the above open areas of the left wall 193 and front wall 196. The head opening 123 is formed across the first cover part 150 and the first frame part 160. While the tape cassette 100 is mounted in the cassette mounting compartment 10 of the printing device 1, the print head 71 and heat sink 72 are arranged inside the head opening 123. The print head 71 performs printing on the tape 101 inside the head opening 123.

The head opening 123 is defined by inner walls 123A, 123B, 123C, and 123D. The inner walls 123A and 123B are orthogonal to the left-right direction. The inner wall 123C is orthogonal to the up-down direction. The inner wall 123D is orthogonal to the front-rear direction. The inner wall 123A is connected to left edges of the inner walls 123C and 123D and extends forward from the inner wall 123D and upward from the inner wall 123C. The inner wall 123B is connected to right edges of the inner walls 123C and 123D and extends forward from the inner wall 123D and upward from the inner wall 123C. The inner wall 123A is positioned on the left side of the inner wall 123B and opposes the same. The main case 120 has an arm portion 127 that has the inner wall 123A and that extends upward. The draw-out area 124 is formed in an upper end of the arm portion 127. The tape 101 and ink ribbon 104 are conveyed inside the arm portion 127 and drawn into the head opening 123 through the draw-out area 124. In the head opening 123, the tape 101 is overlaid on the ink ribbon 104 and is exposed outside the main case 120.

The discharge opening 126 is formed in the first case 121 on an upper-left side of the head opening 123. The tape 101 drawn into the head opening 123 is discharged from the main case 120 through the discharge opening 126. The tape 101 is discharged in the upward direction through the discharge opening 126. The ink ribbon 104 is drawn back inside the main case 120 through a re-entry opening (not shown) provided near the discharge opening 126 and is taken up on the take-up spool 107.

Figure 13:
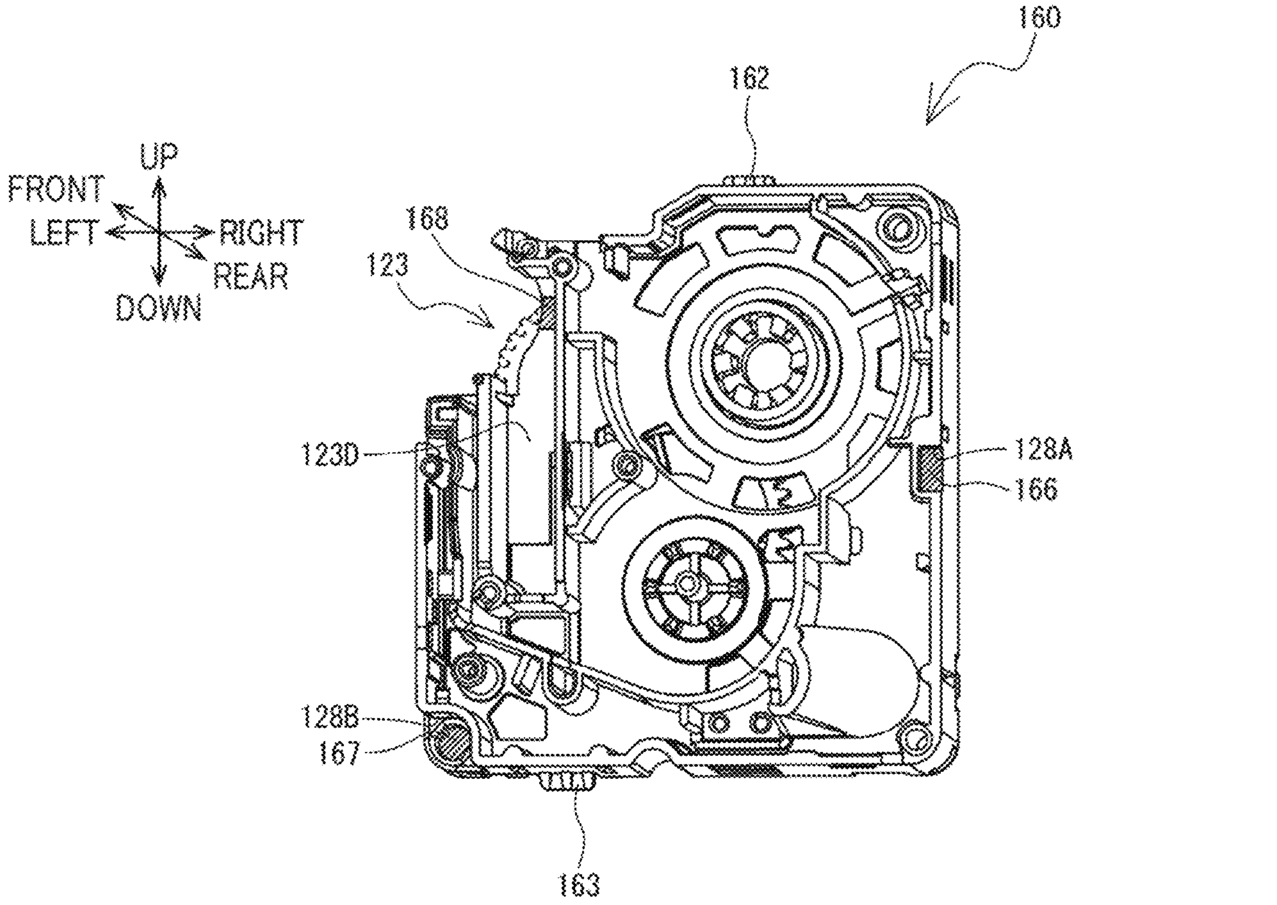
FIG. 13 is a perspective view of a first frame part 160 as viewed from a lower-right-front side thereof.

As shown in FIGS. 11 through 13, the first frame part 160 has the engaging protrusions 162 and 163, and the receiving parts 166, 167, and 168. The engaging protrusions 162 and 163 are respectively provided on the upper wall 191 and lower wall 192 of the main case 120. While the tape cassette 100 is mounted in the cassette mounting compartment 10, the engaging protrusions 162 and 163 are respectively engaged with the hooks 12A and 13A in the cassette mounting compartment 10. The engagement between the engaging protrusions 162 and 163 and the hooks 12A and 13A need only be strong enough to restrict the tape cassette 100 from falling out of the cassette mounting compartment 10 when the rear cover 3 is open and is not intended to hinder the user from mounting and removing the tape cassette 100.

The receiving parts 166, 167, and 168 are the portions of the tape cassette 100 that contact the support parts 16, 17, and 18 of the cassette mounting compartment 10 from the rear when the tape cassette 100 is mounted in the cassette mounting compartment 10. The receiving parts 166, 167, and 168 are positioned apart from each other. The receiving part 166 is provided on a rear end of a recess 128A, which is recessed leftward into the right wall 194 of the main case 120 at an approximate up-down center thereof. The recess 128A is continuous with the front wall 196 and extends rearward to a position near the front end of the first frame part 160. The receiving part 166 is designed to contact the rear end of the rib-like support part 16 when the tape cassette 100 is mounted in the cassette mounting compartment 10.

The receiving part 167 is provided on a rear end of a recess 128B, which is recessed rightward and upward into the corner of the main case 120 formed by the left wall 193 and lower wall 192. The recess 128B is continuous with the front wall 196 and extends rearward to a position near a front-rear center of the first frame part 160. The receiving part 167 is designed to contact the support part 17 on the rod-shaped pin 19 when the tape cassette 100 is mounted in the cassette mounting compartment 10.

The receiving part 168 is provided on an upper end of the inner wall 123D defining the head opening 123. The receiving part 168 is exposed toward the front of the tape cassette 100 through the head opening 123. The receiving part 168 is designed to contact the support part 18 provided on the rear surface of the upper portion of the heat sink 72, which is inserted in the head opening 123 when the tape cassette 100 is mounted in the cassette mounting compartment 10.

Next, operations of the printing device 1 during printing will be described.

While the tape cassette 100 is mounted in the printing device 1, the print head 71 is at a position in the head opening 123 overlapping the tape 101 and ink ribbon 104 in the left-right direction. The platen roller 82 conveys the tape 101 into the head opening 123 and presses the tape 101 against the print head 71, whose heating elements 71A have been heated, through the ink ribbon 104. As a result, some ink provided on the surface of the ink ribbon 104 is transferred onto the tape 101 to print characters, symbols, and the like on the tape 101.

The platen roller 82 conveys the printed tape 101 in the tape cassette 100 through the discharge opening 126 toward the outside of the tape cassette 100. The platen roller 82 is rotated by the platen gear 83, which is engaged with the output gear 131. By pivoting the platen unit 80, the platen roller 82 can be made movable between the separated position separated from the print head 71 and the adjacent position in proximity to the print head 71.

While the main case 120 of the tape cassette 100 is inserted in the cassette mounting compartment 10, the drive shaft 63 is engaged with the input gear 134 and the platen gear 83 is engaged with the output gear 131. Specifically, while the drive shaft 63 is inserted into the take-up spool 107 and the input gear 134 of the tape cassette 100, the platen gear 83 is engaged with the output gear 131 by moving the platen roller 82 into the adjacent position.

With the tape cassette 100 in the mounted state, the output gear 131 is rotated via the idle gear 137 when the drive shaft 63 rotates the input gear 134. Further, the platen roller 82 is rotated when the platen gear 83 is rotated by the rotation of the output gear 131.

Figure 14:
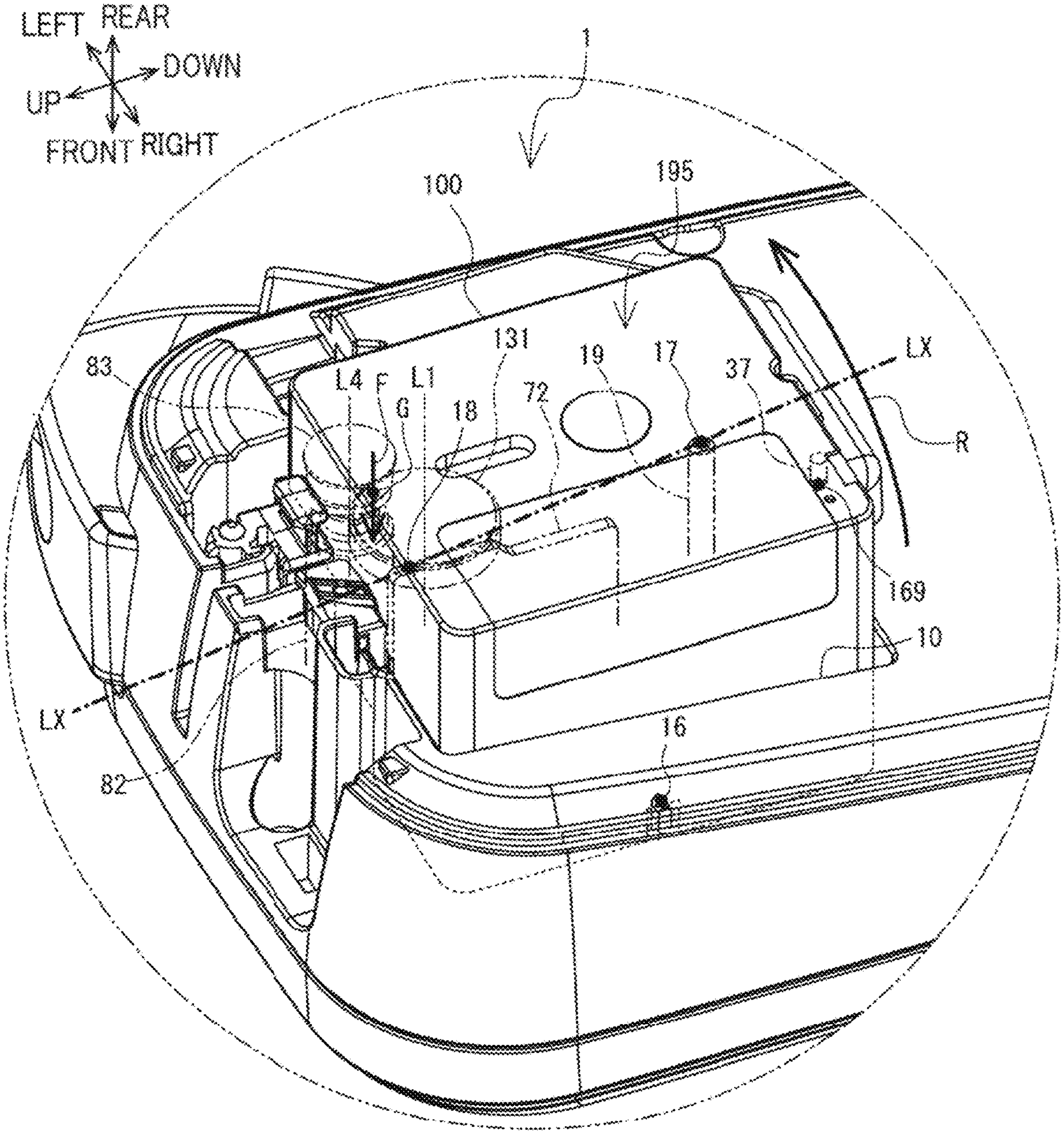
FIG. 14 is an enlarged perspective view of an upper portion of the printing device 1 as viewed from an upper-right-rear side thereof in a state where the tape cassette 100 is mounted.
Figure 15:
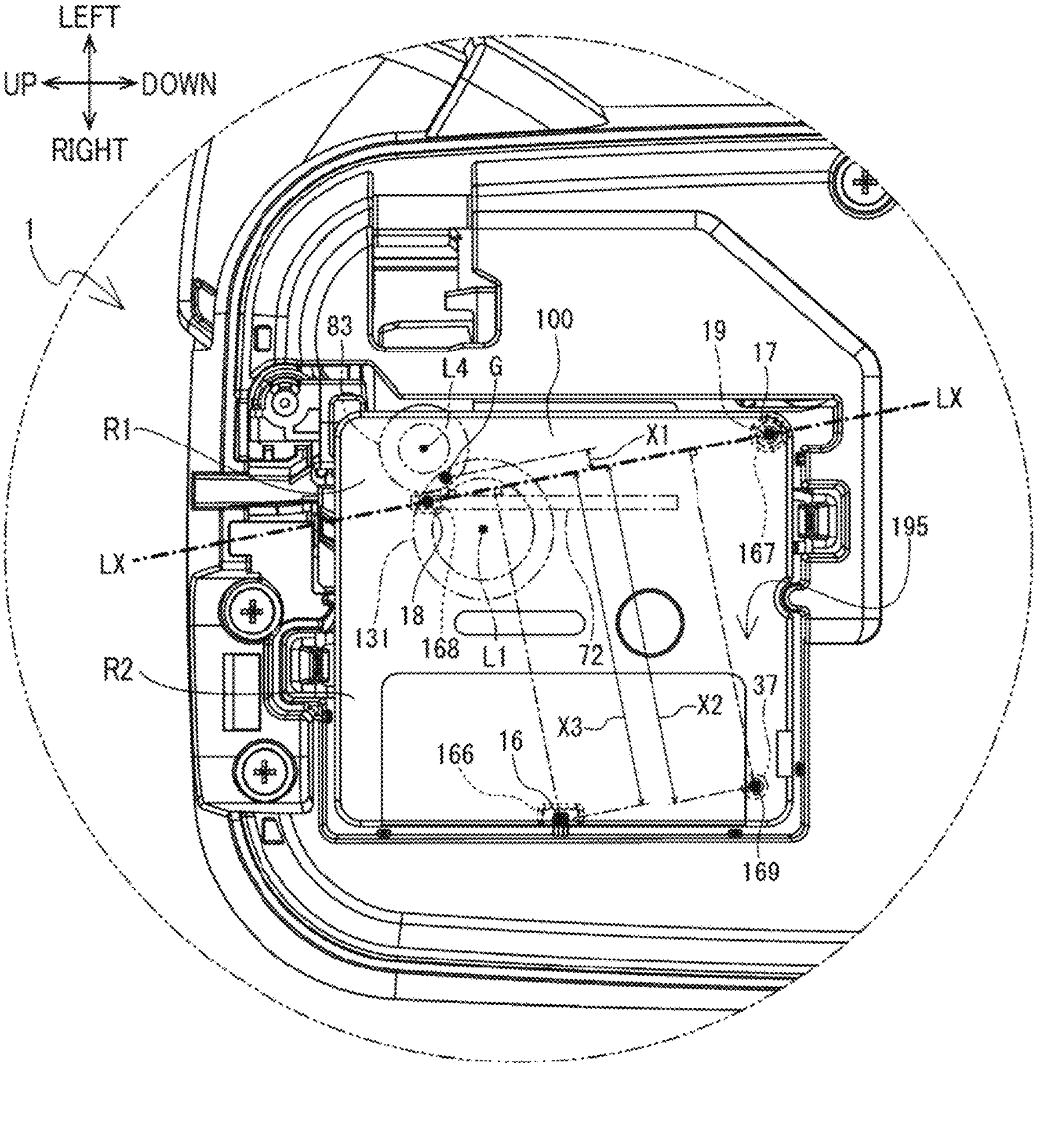
FIG. 15 is an enlarged rear view of the upper portion of the printing device 1 in the state where the tape cassette 100 is mounted.

As shown in FIGS. 14 and 15, the front end portion of the tape cassette 100 is supported at three points by the support parts 16, 17, and 18 in the cassette mounting compartment 10. When viewed in the front-rear direction, the support part 18 of the heat sink 72 is positioned in an upper-left section of the tape cassette 100 near the mesh point G between the platen gear 83 and output gear 131. The support part 17 of the pin 19 is positioned in a lower-left corner section of the tape cassette 100. A distance between the support part 17 and the mesh point G is greater than a distance between the support part 18 and the mesh point G. The support part 16 is positioned in a right edge section of the tape cassette 100 on an approximate up-down center thereof. A distance between the support part 16 and the mesh point G is greater than the distance between the support part 17 and the mesh point G.

The thrust load F generated at the mesh point G when the drive force is transmitted from the output gear 131 to the platen gear 83 acts in a direction for pushing the output gear 131 forward relative to the platen gear 83. In other words, the forward thrust load F acts on the tape cassette 100 at the mesh point G. Accordingly, the tape cassette 100 supported at three points by the support parts 16, 17, and 18 is urged by the thrust load F to rotate in a direction indicated by an arrow R (see FIG. 14) about a virtual axis LX passing through the two support parts 17 and 18. That is, the axis LX passes through the receiving parts 167 and 168.

In other words, since the mesh point G is located in an area R1 on the opposite side of the axis LX from the support part 16 when viewed from the rear, the tape cassette 100 is urged to rotate while the printing device 1 is driving (while the thrust load F is generated). Thus, the direction R in which the tape cassette 100 is urged to rotate about the axis LX is such that the area R1 on the side with the mesh point G is urged forward while an area R2 on the side with the receiving part 166 contacting the support part 16 is urged rearward.

Note that the tape cassette 100 is not urged to rotate about a virtual axis passing through the two support parts 16 and 17 since the support part 18 is provided on the same side as the mesh point G. Similarly, the tape cassette 100 is not urged to rotate about a virtual axis passing through the two support parts 16 and 18 because the support part 17 is provided on the same side as the mesh point G.

When the printing device 1 is viewed from the rear while the tape cassette 100 is in the mounted state, the restriction part 37 of the rear cover 3 is positioned on a lower-right corner of the rear wall 195 constituting the tape cassette 100. Since the thrust load F is not produced while the printing device 1 is a non-driving state, the restriction part 37 is not in contact with the rear wall 195 of the tape cassette 100 at this time. However, the restriction part 37 may be configured to also contact the rear wall 195 of the tape cassette 100 while the printing device 1 is in the non-driving state. When the printing device 1 begins driving, the thrust load F produced at the mesh point G urges the tape cassette 100 to rotate about the axis LX, at which time the restriction part 37 contacts the rear wall 195 of the tape cassette 100. Hereinafter, for convenience, a part on the rear wall 195 of the tape cassette 100 that the restriction part 37 contacts while the printing device 1 is driving will be called a contact part 169. Owing to the restriction part 37 contacting the contact part 169 when the tape cassette 100 is urged to rotate about the axis LX, the tape cassette 100 is fixed in position at the three points of the support part 17, support part 18, and contact part 169. Accordingly, the orientation of the tape cassette 100 is stabilized while the printing device 1 is driving.

The restriction part 37 is formed integrally with the window frame 36, which holds the window 35 in the rear cover 3. The window frame 36 is thicker and more rigid than the walls forming the rear cover 3. Accordingly, the rear cover 3 does not flex, even when the contact part 169 of the tape cassette 100 is made to contact the restriction part 37 by the thrust load F.

Here, referring to FIG. 15, in a rear side view, a distance between the axis LX and the mesh point G in a direction orthogonal to the axis LX is defined as a distance X1 while a distance between the axis LX and the contact part 169 (restriction part 37) in the same direction is defined as a distance X2. Here, the distance X2 is greater than the distance X1. In other words, when the tape cassette 100 is urged to rotate by the thrust load F so that the restriction part 37 contacts the contact part 169, the stress that the restriction part 37 receives from the contact part 169 is smaller than the thrust load F according to the principle of leverage. Thus, the rear cover 3 does not flex even when the contact part 169 of the tape cassette 100 contacts the restriction part 37 due to the thrust load F. Note that, if a distance in the direction orthogonal to the axis LX between the axis LX and the support part 16 provided on the right end of the main case 120 in the up-down center thereof is defined as a distance X3, the distance X2 is greater than the distance X3. Providing the contact part 169 in the lower-right corner of the rear wall 195 constituting the tape cassette 100 can ensure that the distance X2 is longer than the distance X3. Therefore, the stress that the restriction part 37 receives from the contact part 169 is smaller than if the contact part 169 were provided at the location of the support part 16.

In a rear-side view, the support part 16 is arranged closer to the contact part 169 than the support parts 17 and 18 are to the contact part 169. As the printing device 1 shifts from its driving state to its non-driving state, the thrust load F is eliminated, causing the tape cassette 100 to be urged forward on the contact part 169 side. At this time, the tape cassette 100 is stably supported by the three support parts 16, 17, and 18 as the receiving part 166 contacts the support part 16 positioned near the contact part 169.

To prevent the tape cassette 100 from rotating due to the thrust load F, the mesh point G could be arranged within an area of a virtual triangle formed by connecting the three support parts 16, 17, and 18. However, the configuration of the present embodiment makes a point to allow the tape cassette 100 to be rotated by the thrust load F and stabilizes the orientation of the tape cassette 100 by fixing the position of the tape cassette 100 in its rotated state. This configuration eliminates the need to arrange the mesh point G within the area of the virtual triangle formed by connecting the three support parts 16, 17, and 18, thereby allowing for a freer layout of the internal components.

As described above, the platen gear 83 of the printing device 1 is configured to be engaged with the output gear 131 of the tape cassette 100 and transmit the drive force from the output gear 131 for rotating the platen roller 82. The platen gear 83 is a helical gear. At the mesh point G between the platen gear 83 and output gear 131, the thrust load F in the mounting direction (forward) is generated on the output gear 131 side. Consequently, the tape cassette 100 is urged to rotate about the axis LX passing through the two support parts 17 and 18 so that the output gear 131 side moves in the mounting direction (forward). Therefore, the area R2 of the tape cassette 100 on the side of the axis LX opposite the output gear 131 (area R1) moves in the opposite direction (rearward) to the mounting direction (forward). The restriction part 37 of the rear cover 3 contacts the rear wall 195 of the tape cassette 100 to restrict rotation of the tape cassette 100. Therefore, the printing device 1 can stabilize the orientation of the tape cassette 100 by keeping the restriction part 37 in contact with the rear wall 195 while driving, thereby suppressing deviation in the position of the tape 101 being drawn out of the tape cassette 100.

The restriction part 37 protrudes from a wall surface (inner surface) of the rear cover 3 facing the cassette mounting compartment 10 side. Therefore, when the printing device 1 is driving, the restriction part 37 can reliably contact the rear wall 195 of the tape cassette 100 to stabilize the orientation of the same.

The window frame 36 provided with the restriction part 37 is formed thicker than the walls around the window frame 36, thereby increasing the rigidity around the restriction part 37. Therefore, flexure in the rear cover 3 can be restrained while the printing device 1 is driving, even when the restriction part 37 incurs a load necessary for suppressing the rotation of the tape cassette 100 caused by the thrust load F. Accordingly, the printing device 1 can stabilize the orientation of the tape cassette 100 while the printing device 1 is driving.

The restriction part 37 contacts the tape cassette 100 at a position (contact part 169) farther away from the axis LX than the mesh point G is from the axis LX. Therefore, according to the principle of leverage, the printing device 1 can reduce the load required by the restriction part 37 to suppress the rotation of the tape cassette 100 due to the thrust load F generated when the printing device 1 is driving. Accordingly, the printing device 1 can easily stabilize the orientation of the tape cassette 100 while driving.

Since the thrust load F is not generated on the output gear 131 when the printing device 1 is not driving, the area R2 of the tape cassette 100 on the opposite side of the axis LX from the mesh point G moves in the mounting direction (forward). Since the support part 16 is positioned at or near the restriction part 37 when viewed in the mounting direction (forward), the support part 16 can reliably support the tape cassette 100. Therefore, the printing device 1 can stabilize the orientation of the tape cassette 100 even when not driving.

The output gear 131 of the tape cassette 100 is configured to mesh with the platen gear 83 of the printing device 1 and transmit the drive force to the platen gear 83 for rotating the platen roller 82. The output gear 131 is a helical gear, and the thrust load F in the mounting direction (forward) is generated on the output gear 131 at the mesh point G between the platen gear 83 and output gear 131. Consequently, the tape cassette 100 is urged to rotate about the axis LX passing through the two receiving parts 167 and 168 so that the side of the output gear 131 with the mesh point G (area R1) moves in the mounting direction (forward). Thus, the area R2 of the tape cassette 100 on the opposite side of the axis LX from the area R1 (the side of the output gear 131 with the mesh point G) moves in the opposite direction (rearward) to the mounting direction (forward). The restriction part 37 of the rear cover 3 provided at a position corresponding to the area R2 contacts the rear wall 195 of the tape cassette 100 to restrict rotation of the same. Hence, the tape cassette 100 can suppress displacement of the tape 101 being drawn out of the tape cassette 100 because the rear wall 195 is pressed by the restriction part 37 when the printing device 1 is driving, thereby stabilizing the orientation of the tape cassette 100.

The tape cassette 100 contacts the restriction part 37 at a position farther than the mesh point G from the axis LX. Therefore, the load applied to the restriction part 37 when the tape cassette 100 is rotated by the thrust load F while the printing device 1 is driving can be made smaller than otherwise according to the principle of leverage, and, hence, the orientation of the tape cassette 100 can easily be stabilized.

The restriction part 37 contacts the main case 120 in a corner portion having high rigidity. Therefore, the rear wall 195 does not flex even when pressed by the restriction part 37 as the printing device 1 is driving, enabling the orientation of the tape cassette 100 to be easily stabilized.

The receiving part 168 is supported by the heat sink 72 of the print head 71. The heat sink 72 is metal and highly rigid. Hence, by supporting the receiving part 168 with this heat sink 72, the orientation of the tape cassette 100 can be stabilized when the printing device 1 is driving.

The receiving part 167 is provided in a rigid corner portion of the main case 120. Therefore, the front end portion of the tape cassette 100 does not flex even when the receiving part 167 is supported by the support part 17 while the printing device 1 is driving, thereby easily stabilizing the orientation of the tape cassette 100.

The output gear 131 is configured to mesh with the platen gear 83, which is connected to the platen roller 82 that conveys the tape 101. Accordingly, the output gear 131 is configured to rotate in a direction for moving the gear teeth of the output gear 131 downstream at the mesh point G (the direction in which the tape 101 is conveyed in the head opening 123). The gear teeth are angled such that, at the mesh point G, the end of each gear tooth on the downstream side in the mounting direction (the front end) is positioned farther downstream in the conveying direction than the end of each gear tooth on the opposite side (the rear end). Therefore, through contact between the gear teeth on the output gear 131 and the gear teeth on the platen gear 83 at the mesh point G, the thrust load F in the mounting direction (forward) can be generated on the output gear 131.

In the above embodiment, the printing device 1 is an example of "printing device" of the present disclosure. The housing 2 is an example of "housing" of the present disclosure. The cassette mounting compartment 10 is an example of "mounting compartment" of the present disclosure. The printing unit 50 is an example of "printing unit" of the present disclosure. The print head 71 is an example of "print head" of the present disclosure. The platen roller 82 is an example of "platen roller" of the present disclosure. The platen gear 83 is an example of "platen gear" of the present disclosure. The rear cover 3 is an example of "cover" of the present disclosure. The restriction part 37 is an example of "restriction part" of the present disclosure. The tape cassette 100 is an example of "tape cassette" of the present disclosure. The front side of the tape cassette 100 is an example of "one end portion" of the present disclosure. The rear side of the tape cassette 100 is an example of "other end portion" of the present disclosure. The forward direction is an example of "mounting direction" of the present disclosure. The output gear 131 is an example of "output gear" of the present disclosure. The rotational axis L4 is an example of "platen-roller axis" of the present disclosure. The rotational axis L1 is an example of "output-gear axis" of the present disclosure. The main case 120 is an example of "case" of the present disclosure. The receiving part 168 is an example of "first receiving part" of the present disclosure. The receiving part 167 is an example of "second receiving part" of the present disclosure. The contact part 169 is an example of "contact part" of the present disclosure. The receiving part 166 is an example of "third receiving part" of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, while the tape cassette 100 is supported by the three support parts 16, 17, and 18 in the cassette mounting compartment 10 of the embodiment, the tape cassette 100 may be supported by four or more support parts instead. The positions at which the support parts are arranged in the cassette mounting compartment 10 may also be modified as needed. The layout position, rotating direction, and gear teeth orientation of the output gear 131 may be modified as needed, provided that the thrust load F generated at the mesh point G between the output gear 131 and the platen gear 83 acts in a direction for moving the output gear 131 in the mounting direction.

The restriction part 37 on the rear cover 3 need not be rod-shaped but may be rib-shaped, for example. The position of the contact part 169 that is contacted by the restriction part 37 is not limited to the lower right corner of the rear wall 195, provided that the contact part 169 is in an area of the rear wall 195 opposite the side of the axis LX on which the mesh point G is located. For example, the position of the contact part 169 on the rear wall 195 may overlap the receiving part 166 in the front-rear direction.

Figure 16:
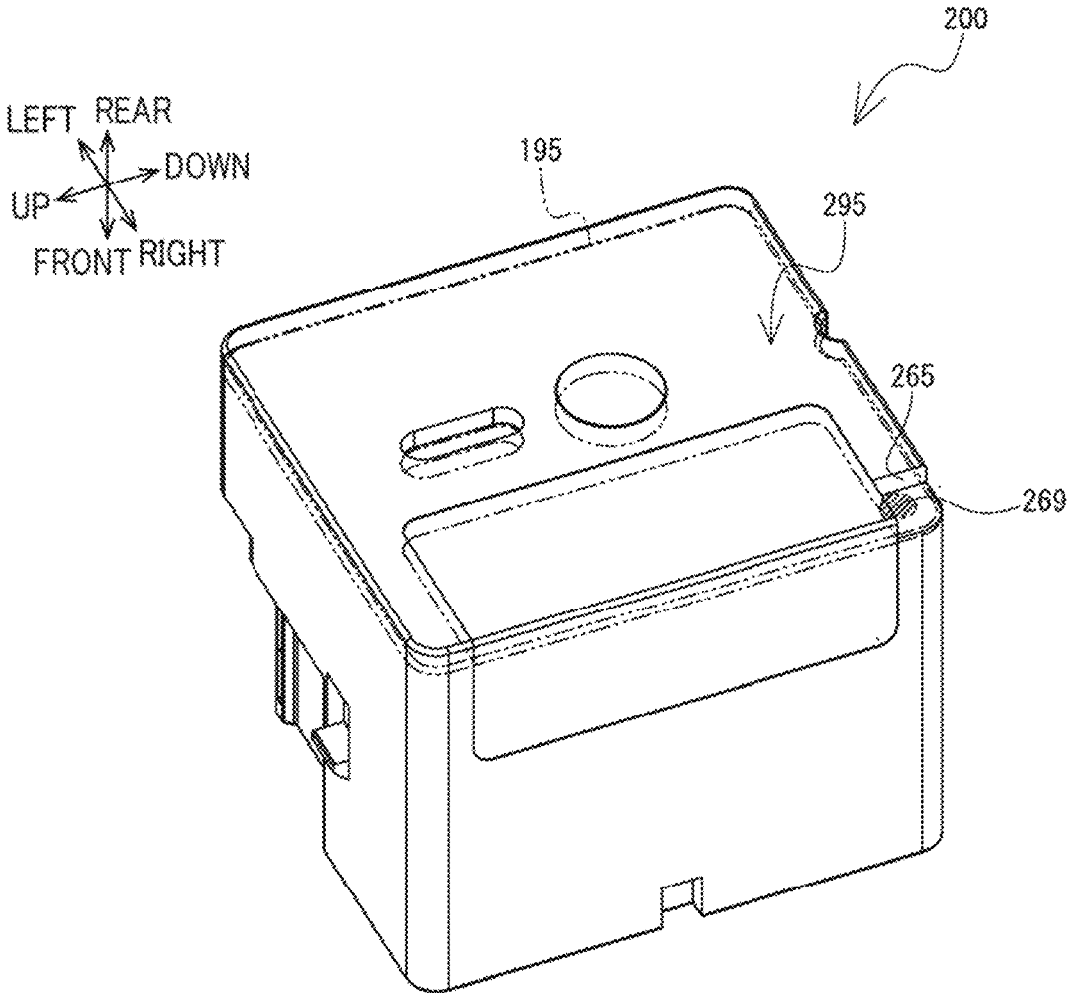
FIG. 16 is a perspective view of a tape cassette 200 as viewed from an upper-right-rear side thereof.

As a modification to the tape cassette 100 according to the embodiment, FIG. 16 illustrates a tape cassette 200 that accommodates a tape of a different width from the tape 101. As shown in FIG. 16, the tape cassette 200 accommodates a tape (not shown) having a wider with than the tape 101 accommodated in the tape cassette 100. Consequently, the tape cassette 200 has a larger front-rear dimension than the tape cassette 100 so that the position of a rear wall 295 of the tape cassette 200 is farther rearward than the rear wall 195 of the tape cassette 100. In FIG. 16, the rear wall 195 of the tape cassette 100 is depicted with two-dot chains for comparison.

The tape cassette 200 can be mounted in the cassette mounting compartment 10 of the printing device 1. However, the rear cover 3 need not be interchanged to match the tape cassette 200, provided that the height position in the front-rear direction of a contact part 269, which is contacted by the restriction part 37 of the rear cover 3 when the tape cassette 200 is mounted in the cassette mounting compartment 10, is identical to the height position in the front-rear direction of the contact part 169 for the tape cassette 100. To this end, a recess 265 may be formed in a lower-right corner of the rear wall 295 where the contact part 269 is to be provided so that the height position in the front-rear direction at the bottom of the recess 265 is the same as the height position of the rear wall 195 for the tape cassette 100. In this way, the depth of the recess 265 formed in the lower-right corner of the rear wall 295 is set according to the thickness of the tape cassette 200 in the front-rear direction in order that the height position of the contact part 269 formed in the bottom of the recess 265 is aligned with the height position of the rear wall 195 for the tape cassette 100. This configuration ensures that the height position of the contact part 269 contacted by the restriction part 37 is constant regardless of the width of the tape accommodated in the tape cassette 200. Therefore, the tape cassette 200 can support tapes of various widths.

The tape cassette 100 in the depicted embodiment is a receptor-type tape cassette that can transfer ink from the ink ribbon 104 onto the surface of the tape 101, but the present disclosure is not limited to this type. For example, the tape cassette 100 may be a tape cassette for enabling printing on any of various types of tape, such as double-sided adhesive tape, film tape, and laminated tape.

What is claimed is:

1. A printing device comprising:

a housing;

a mounting compartment provided in the housing and having a recessed shape to provide an opening, a tape cassette accommodating a printing tape being mountable in the mounting compartment through the opening in a mounting direction, the mounting compartment comprising a first support part and a second support part;

a printing unit provided in the housing and configured to perform printing on the printing tape drawn out of the tape cassette mounted in the mounting compartment, the printing unit comprising:

a print head;

a platen roller configured to oppose the print head and rotatable about a platen-roller axis parallel to the mounting direction to convey the printing tape of the tape cassette mounted in the mounting compartment; and a platen gear connected to the platen roller; and a cover attachable to and detachable from the housing to provide a closed state where the cover closes the opening of the mounting compartment and an open state where the cover exposes the opening of the mounting compartment, the cover comprising a restriction part, wherein the first support part and the second support part support one end portion of the tape cassette mounted in the mounting compartment, the mounting compartment having a bottom surface configured to face the one end portion of the tape cassette mounted in the mounting compartment, wherein the platen gear is configured to mesh with an output gear of the tape cassette at a mesh point to receive a driving force from the output gear while the tape cassette is mounted in the mounting compartment, the output gear being rotatable about an output-gear axis parallel to the mounting direction, wherein the platen gear and the output gear of the tape cassette are helical gears configured such that a thrust load is applied to the output gear in the mounting direction at the mesh point while the platen gear and the output gear meshing each other are rotating, wherein, while the cover is in the closed state, the restriction part is positioned in a region that is on an opposite side of an axis from the mesh point when viewed in the mounting direction, the axis passing through the first support part and the second support part, and wherein, while the cover is in the closed state, the restriction part is configured to contact an other end portion of the tape cassette opposite the one end portion in the mounting direction to restrict the tape cassette mounted in the mounting compartment from rotating about the axis by the thrust load applied on the output gear.

2. The printing device according to claim 1, wherein the cover has an inner wall surface configured to face the mounting compartment while the cover is in the closed state, the restriction part protruding in the mounting direction from the inner wall surface.

3. The printing device according to claim 1, wherein the cover has a window through which at least part of the mounting compartment is visible while the cover is in the closed state, the window being enclosed by a window frame provided on an inner wall surface of the cover, and wherein the restriction part is provided on the window frame.

4. The printing device according to claim 1, wherein, when viewed in the mounting direction, the restriction part of the cover in the closed state and the axis define a distance therebetween in a direction orthogonal to the axis that is greater than a distance defined between the mesh point and the axis in the direction orthogonal to the axis.

5. The printing device according to claim 1, wherein the mounting compartment further comprises a third support part at a position coincident with or near the restriction part of the cover in the closed state when viewed in the mounting direction.

6. The printing device according to claim 5, wherein the third support part is a rib extending toward the opening from the bottom surface of the mounting compartment.

7. The printing device according to claim 1, wherein the first support part is an end face of a heat sink of the print head.

8. The printing device according to claim 1, wherein the second support part is an end face of a pin extending toward the opening from the bottom surface of the mounting compartment.

9. A tape cassette mountable in a mounting compartment of a printing device in a mounting direction, the printing device including: a housing; the mounting compartment provided in the housing and having a recessed shape to provide an opening, the mounting compartment comprising a first support part and a second support part; a printing unit provided in the housing; and a cover attachable to and detachable from the housing to provide a closed state where the cover closes the opening of the mounting compartment and an open state where the cover exposes the opening of the mounting compartment, wherein the printing unit includes: a print head; a platen roller configured to oppose the print head; and a platen gear connected to the platen roller, the tape cassette comprising:

a tape roll which is a roll of a printing tape subject to printing by the printing unit of the printing device;

a case accommodating the tape roll, the case having one end portion and an other end portion opposite each other in the mounting direction, the one end portion being configured to face a bottom surface of the mounting compartment while the tape cassette is mounted in the mounting compartment, the case including:

a first receiving part provided at the one end portion, the first receiving part being configured to be supported by the first support part through contact therewith while the tape cassette is mounted in the mounting compartment;

a second receiving part provided at the one end portion, the second receiving part being configured to be supported by the second support part through contact therewith while the tape cassette is mounted in the mounting compartment; and a contact part provided at the other end portion, the contact part being configured to contact a restriction part of the cover while the tape cassette is mounted in the mounting compartment and the cover is in the closed state; and an output gear rotatably supported by the case and rotatable about an output-gear axis parallel to the mounting direction, wherein the output gear is configured to mesh with the platen gear at a mesh point to transmit a driving force from an outside of the tape cassette to the platen gear while the tape cassette is mounted in the mounting compartment, wherein the output gear and the platen gear are helical gears configured such that a thrust load is applied to the output gear at the mesh point while the output gear and the platen gear meshing each other are rotating, wherein, while the tape cassette is mounted in the mounting compartment, the contact part is positioned in a region that is on an opposite side of an axis from the mesh point when viewed in the mounting direction, the axis passing through the first receiving part and the second receiving part, and wherein, while the tape cassette is mounted in the mounting compartment, the contact part is configured to contact the restriction part of the cover in the closed state to restrict the tape cassette from rotating about the axis by the thrust load applied on the output gear.

10. The tape cassette according to claim 9, wherein, while the tape cassette is mounted in the mounting compartment, the contact part and the axis define a distance therebetween in a direction orthogonal to the axis that is greater than a distance defined between the mesh point and the axis in the direction orthogonal to the axis when viewed in the mounting direction.

11. The tape cassette according to claim 9, wherein the contact part is provided at a corner portion of the other end portion of the case.

12. The tape cassette according to claim 9, wherein the contact part is provided in a recess that is recessed in the mounting direction from an outer surface of the other end portion of the case.

13. The tape cassette according to claim 9, wherein the first receiving part is configured to be supported by a heat sink of the print head.

14. The tape cassette according to claim 9, wherein the case further includes a third receiving part provided at the one end portion, and wherein one of the first receiving part, the second receiving part and the third receiving part is provided at a corner portion of the one end portion of the case.

15. The tape cassette according to claim 9, wherein the case has a draw-out part through which the printing tape is configured to be discharged to an outside of the case in a draw-out direction crossing the mounting direction, and wherein the output gear has gear teeth that are skewed such that, at the mesh point, an end of a gear tooth on a downstream side in the mounting direction is positioned farther downstream in the draw-out direction than an end of the gear tooth on an upstream side in the mounting direction.

* * * * *